United States Patent
Fujishiro et al.

(10) Patent No.: US 10,582,437 B2
(45) Date of Patent: *Mar. 3, 2020

(54) USER TERMINAL

(71) Applicant: KYOCERA Corporation, Kyoto (JP)

(72) Inventors: Masato Fujishiro, Yokohama (JP); Chiharu Yamazaki, Tokyo (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/276,486

(22) Filed: Feb. 14, 2019

(65) Prior Publication Data
US 2019/0182742 A1    Jun. 13, 2019

Related U.S. Application Data

(63) Continuation of application No. 15/727,450, filed on Oct. 6, 2017, now Pat. No. 10,251,112, which is a
(Continued)

(51) Int. Cl.
*H04W 36/30* (2009.01)
*H04W 16/32* (2009.01)
(Continued)

(52) U.S. Cl.
CPC ......... *H04W 36/30* (2013.01); *H04J 11/0093* (2013.01); *H04W 16/32* (2013.01);
(Continued)

(58) Field of Classification Search
CPC ............. H04W 36/30; H04W 36/0061; H04W 36/0083; H04W 16/32; H04W 48/12;
(Continued)

(56) References Cited

U.S. PATENT DOCUMENTS

2007/0232238 A1  10/2007  Kawasaki
2009/0104905 A1   4/2009  Digirolamo et al.
(Continued)

FOREIGN PATENT DOCUMENTS

JP    H09-023471 A    1/1997
JP    2007-221277 A   8/2007
(Continued)

OTHER PUBLICATIONS

Alcatel-Lucent, Verizon; "Idle UE Distribution in Macro Only System and HetNets"; 3GPP TSG-RAN WG2 Meeting #86; R2-142495; May 19-23, 2014; 6 pages; Seoul, South Korea.
(Continued)

*Primary Examiner* — Mong-Thuy T Tran
(74) *Attorney, Agent, or Firm* — Studebaker & Brackett PC

(57) ABSTRACT

A user equipment for a mobile communication system, and method and chip thereof, receives a first parameter and a second parameter broadcasted from the current serving cell, and reselects a target cell to be used as a serving cell from among plural cells operated at different frequencies. The first parameter defines a probability for performing reselection of the target cell, and the second parameter is a timer value to be set in a timer started at a timing at which a quality measurement for neighbor cells ends. Reselecting includes, after receiving the first and second parameter, periodically measuring qualities of neighbor cells at timer defined timings, comparing a value corresponding to IMSI of the user equipment with a value corresponding to the first parameter, and reselecting the target cell from among cells having a quality satisfying predetermined quality criteria, based on results of the quality measurement and the comparison.

3 Claims, 13 Drawing Sheets

Related U.S. Application Data continuation of application No. PCT/JP2016/061617, filed on Apr. 8, 2016.

(60) Provisional application No. 62/188,867, filed on Jul. 6, 2015, provisional application No. 62/162,204, filed on May 15, 2015, provisional application No. 62/148,967, filed on Apr. 17, 2015, provisional application No. 62/145,882, filed on Apr. 10, 2015.

(51) Int. Cl.
*H04W 48/12* (2009.01)
*H04W 48/20* (2009.01)
*H04J 11/00* (2006.01)
*H04W 36/00* (2009.01)
*H04W 48/16* (2009.01)

(52) U.S. Cl.
CPC ..... *H04W 36/0061* (2013.01); *H04W 36/0083* (2013.01); *H04W 48/12* (2013.01); *H04W 48/16* (2013.01); *H04W 48/20* (2013.01); *Y02D 70/126* (2018.01); *Y02D 70/1242* (2018.01); *Y02D 70/1262* (2018.01); *Y02D 70/142* (2018.01); *Y02D 70/164* (2018.01); *Y02D 70/21* (2018.01)

(58) Field of Classification Search
CPC ... H04W 48/16; H04W 48/20; H04J 11/0093; Y02D 70/142; Y02D 70/21; Y02D 70/1262; Y02D 70/126; Y02D 70/164; Y02D 70/1242
USPC ......................................................... 455/436
See application file for complete search history.

(56) References Cited

U.S. PATENT DOCUMENTS

| | | | |
|---|---|---|---|
| 2009/0270104 A1* | 10/2009 | Du | H04W 48/02 455/436 |
| 2011/0216732 A1 | 9/2011 | Maeda et al. | |
| 2011/0250891 A1* | 10/2011 | Zou | H04W 36/04 455/437 |
| 2012/0243486 A1 | 9/2012 | Zeira et al. | |
| 2012/0289274 A1 | 11/2012 | Matsuo et al. | |
| 2012/0322447 A1 | 12/2012 | Ramachandran et al. | |
| 2013/0130684 A1* | 5/2013 | Gomes | H04W 4/70 455/435.1 |
| 2014/0169197 A1 | 6/2014 | Damnjanovic et al. | |
| 2014/0179320 A1 | 6/2014 | Jang et al. | |
| 2014/0213277 A1 | 7/2014 | Jang | |
| 2014/0274050 A1 | 9/2014 | Wang et al. | |
| 2014/0329529 A1 | 11/2014 | Jung et al. | |
| 2014/0341188 A1 | 11/2014 | Chang et al. | |
| 2015/0049662 A1* | 2/2015 | Kim | H04W 48/20 370/312 |
| 2015/0245193 A1 | 8/2015 | Xiong et al. | |
| 2016/0050590 A1 | 2/2016 | Ponukumati et al. | |
| 2016/0073312 A1 | 3/2016 | Sridhar | |
| 2016/0127969 A1 | 5/2016 | Pao et al. | |
| 2016/0127970 A1 | 5/2016 | Chuang | |
| 2016/0302118 A1 | 10/2016 | Yiu et al. | |
| 2017/0164250 A1* | 6/2017 | Kim | H04W 68/02 |

FOREIGN PATENT DOCUMENTS

| | | |
|---|---|---|
| JP | 2007-266844 A | 10/2007 |
| JP | 2010-136337 A | 6/2010 |
| JP | 2010-541428 A | 12/2010 |
| JP | 2013-503569 A | 1/2013 |
| WO | 2011/086927 A1 | 7/2011 |
| WO | 2013/111905 A1 | 8/2013 |

OTHER PUBLICATIONS

Intel Corporation; "Potential solution and analysis for multicarrier load distribution"; 3GPP TSG RAN WG2 Meeting #89bis; R2-151185; Apr. 20-24, 2015; 7 pages; Bratislava, Slovakia.

International Search Report issued in PCT/JP2016/061617; dated Jun. 28, 2016.

3rd Generation Partnership Project; Technical Specification Group Radio Access Network; Evolved Universal Terrestrial Radio Access (E-UTRA); User Equipment (UE) Procedures in Idle Mode; 3GPP TS 36.304 v. 12.4.0; Mar. 2015; pp. 1-38; Release 12; 3GPP Organizational Partners.

Intel Corporation; "Resource allocation signaling for D2D discovery"; 3GPP TSG-RAN WG2 #86; R2-142050; May 19-23, 2014; pp. 1-3; Seoul, Korea.

ITRI; "Discussion on Inter-Cell D2D Discovery"; 3GPP TSG RAN WG2 #86; R2-142116; May 19-23, 2014; pp. 1-4; Seoul, Korea.

ZTE; "Resource information for inter-cell D2D discovery"; 3GPP TSG-RAN WG2 Meeting #86; R2-142151; May 19-24, 2014; pp. 1-3; Seoul, Korea.

Samsung; "Priority Handling Function for ProSe Direct Discovery"; 3GPP TSG RAN WG2 Meeting #85bis; R2-142201; May 19-23, 2014; pp. 1-5; Seoul, Korea.

Ericsson; "Resource allocation for ProSe Direct Discovery"; 3GPP TSG-RAN WG2 #86; Tdoc R2-142407; May 19-23, 2014; pp. 1-6; Seoul, Korea.

Qualcomm Incorporated; "Signaling Details for ProSe Direct Discovery"; 3GPP TSG-RAN WG2 #86; R2-142540; May 19-23, 2014; pp. 1-7; Seoul, Korea.

LG Electronics Inc.; "Inter-carrier discovery support"; 3GPP TSG-RAN WG2 #86; R2-142642; May 19-23, 2014; pp. 1-2; Seoul, Korea.

Ericsson; "Inter-Carrier Aspects of D2D Discovery and Communication"; 3GPP TSG RAN WG1 Meeting #77; R1-142406; May 19-23, 2014; pp. 1-3; Seoul, Korea.

Samsung; "Utilization of multiple resource pools based on RSRP for type-1 discovery"; 3GPP TSG RAN WG1 Meeting #78bis; R1-143867; Oct. 6-10, 2014; pp. 1-7; Ljubljana, Slovenia.

ETRI; "Design of HARQ feedback channel for MBMS"; 3GPP TSG RAN WG2 #56; R2-063277; Nov. 6-10, 2006; pp. 1-6; Riga, Latvia.

* cited by examiner

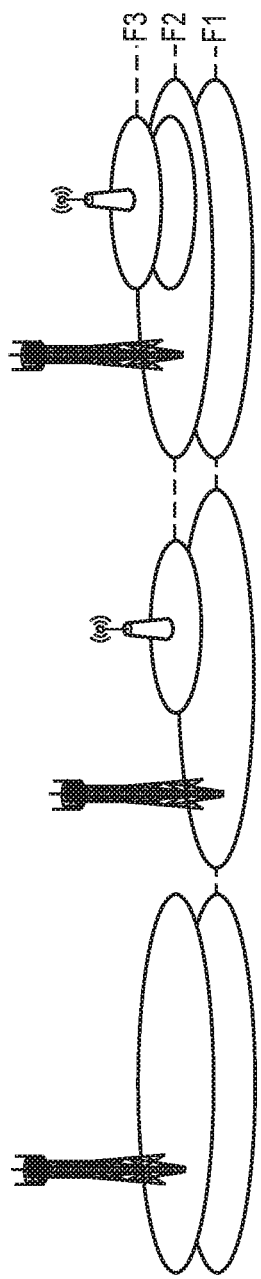

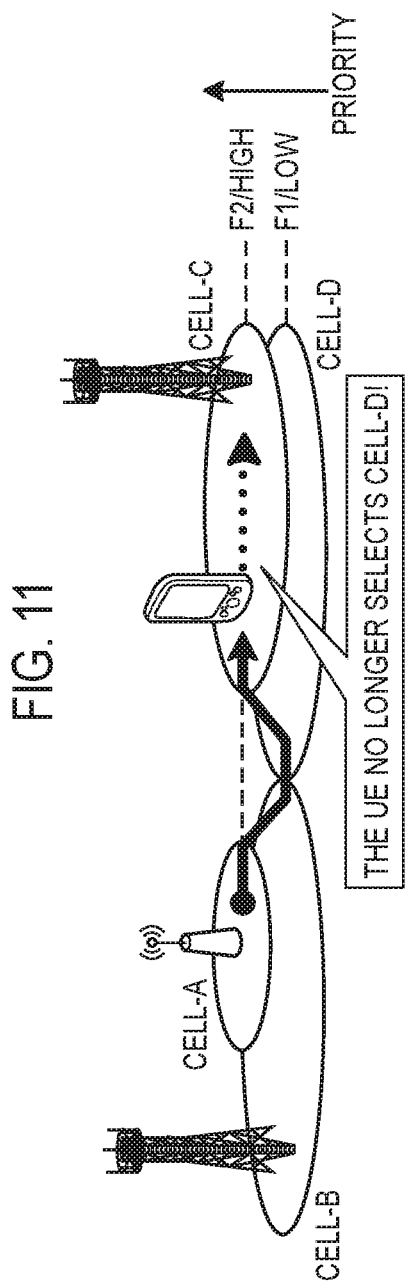

FREQUENCY-DOMAIN CAPACITY

TIME-DOMAIN CAPACITY

SPACE-DOMAIN CAPACITY

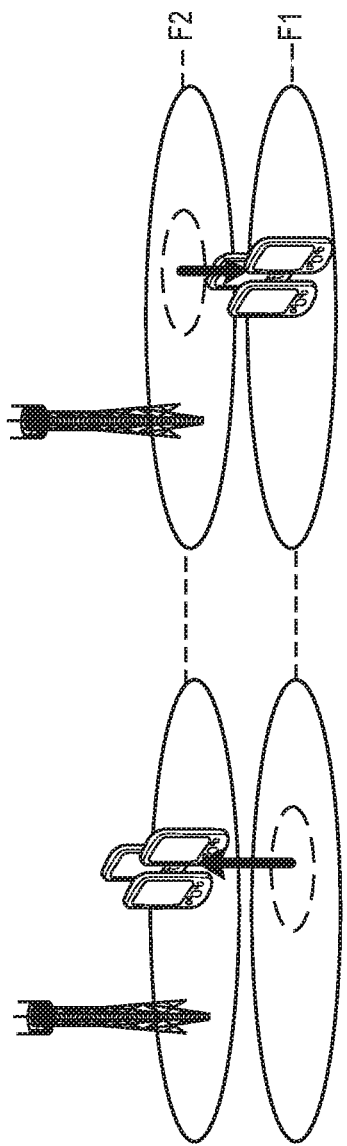

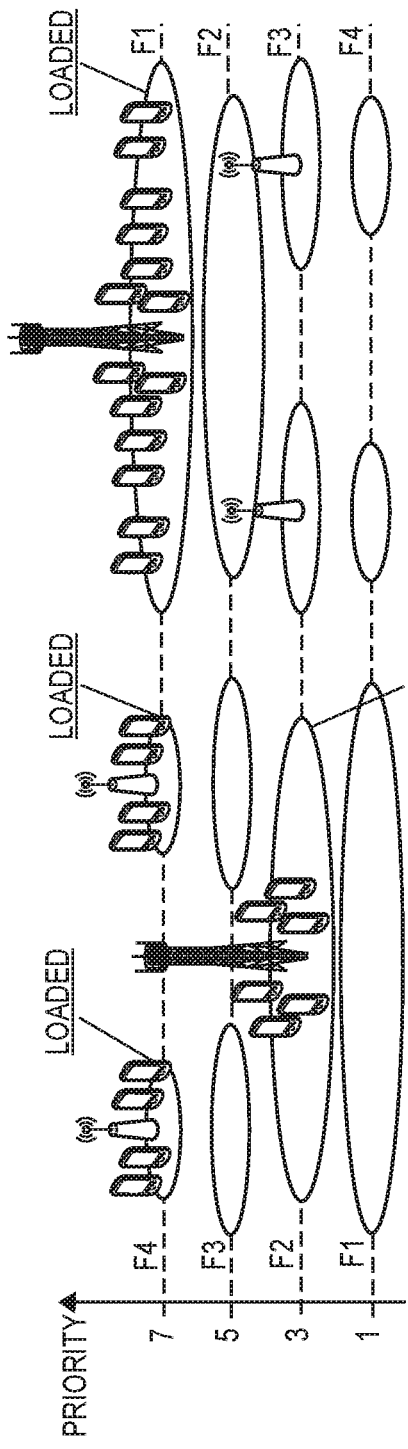
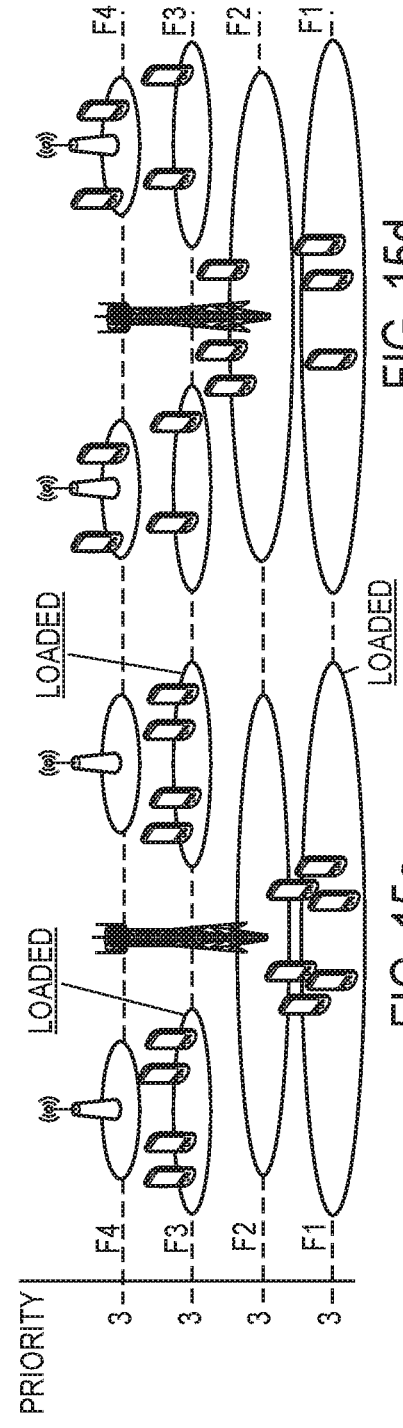
FIG. 15a PRE-CONDITION WITH CAPACITY-PRIORITIZED CONFIGURATION
FIG. 15b PRE-CONDITION WITH COVERAGE-PRIORITIZED CONFIGURATION
FIG. 15c PRE-CONDITION WITH EQUAL PRIORITY CONFIGURATION
FIG. 15d POST-CONDITION AFTER LOAD RE-DISTRIBUTION

USER TERMINAL

CROSS-REFERENCE TO RELATED APPLICATIONS

This application is a Continuation of U.S. patent application Ser. No. 15/727,450 filed Oct. 6, 2017, which is a Continuation of International Application No. PCT/JP2016/061617 filed Apr. 8, 2016, which claims the benefit of U.S. Provisional Application No. 62/145,882 filed Apr. 10, 2015, U.S. Provisional Application No. 62/148,967 filed Apr. 17, 2015, U.S. Provisional Application No. 62/162,204 filed May 15, 2015, and U.S. Provisional Application No. 62/188,867 filed Jul. 6, 2015, the entire contents of which are incorporated herein by reference.

TECHNICAL FIELD

The present disclosure relates to a user terminal which is capable of selecting a target cell to be used as a serving cell from among a plurality of cells operated at different frequencies.

BACKGROUND ART

In 3rd Generation Partnership Project (3GPP) which is a mobile communication system standardization project, a technique of selecting a target cell to be used as a serving cell from among a plurality of cells operated at different frequencies has been proposed.

Specifically, in a case in which a start condition is satisfied, a user terminal measures qualities of neighbor cells adjacent to a current serving cell and selects a target cell to be used as a serving cell from among cells satisfying a selection condition.

SUMMARY

A user equipment according to the present disclosure for a mobile communication system comprises a receiver configured to receive a first parameter broadcasted from a current serving cell and a second parameter broadcasted from the current serving cell, and a controller configured to reselect a target cell to be used as a serving cell from among a plurality of cells operated at different frequencies. The first parameter is a parameter that defines a probability for performing reselection of the target cell, and the second parameter is a timer value to be set in a timer started at a timing at which a quality measurement for neighbor cells ends. The controller is configured to, after receiving the first parameter and the second parameter, periodically measure qualities of neighbor cells at timings defined by the timer, compare a value corresponding to IMSI (International Mobile Subscriber Identity) of the user equipment with a value corresponding to the first parameter, and reselect the target cell from among cells having a quality satisfying predetermined quality criteria, based on results of the quality measurement and the comparison.

A method according to the present disclosure, which is performed at a user equipment for a mobile communication system, comprises receiving a first parameter broadcasted from a current serving cell and a second parameter broadcasted from the current serving cell, and reselecting a target cell to be used as a serving cell from among a plurality of cells operated at different frequencies. The first parameter is a parameter that defines a probability for performing reselection of the target cell, and the second parameter is a timer value to be set in a timer started at a timing at which a quality measurement for neighbor cells ends. The reselecting comprises, after receiving the first parameter and the second parameter, periodically measuring qualities of neighbor cells at timings defined by the timer, comparing a value corresponding to IMSI (International Mobile Subscriber Identity) of the user equipment with a value corresponding to the first parameter, and reselecting the target cell from among cells having a quality satisfying predetermined quality criteria, based on results of the quality measurement and the comparison.

A chip according to the present disclosure for a user equipment for a mobile communication system comprises at least one processor and at least one memory. The at least one processor is configured to perform processes of receiving a first parameter broadcasted from a current serving cell and a second parameter broadcasted from the current serving cell, and reselecting a target cell to be used as a serving cell from among a plurality of cells operated at different frequencies. The first parameter is a parameter that defines a probability for performing reselection of the target cell, and the second parameter is a timer value to be set in a timer started at a timing at which a quality measurement for neighbor cells ends. The reselecting comprises, after receiving the first parameter and the second parameter, periodically measuring qualities of neighbor cells at timings defined by the timer, comparing a value corresponding to IMSI (International Mobile Subscriber Identity) of the user equipment with a value corresponding to the first parameter, and reselecting the target cell from among cells having a quality satisfying predetermined quality criteria, based on results of the quality measurement and the comparison.

BRIEF DESCRIPTION OF DRAWINGS

FIGS. 10a to 10c are diagrams according to an additional note of an embodiment.

FIG. 11 is a diagram according to an additional note of an embodiment.

FIGS. 13a and 13b are diagrams according to an additional note of an embodiment.

FIGS. 15a to 15d are diagrams according to an additional note of an embodiment.

DESCRIPTION OF EMBODIMENTS

Figure 1:
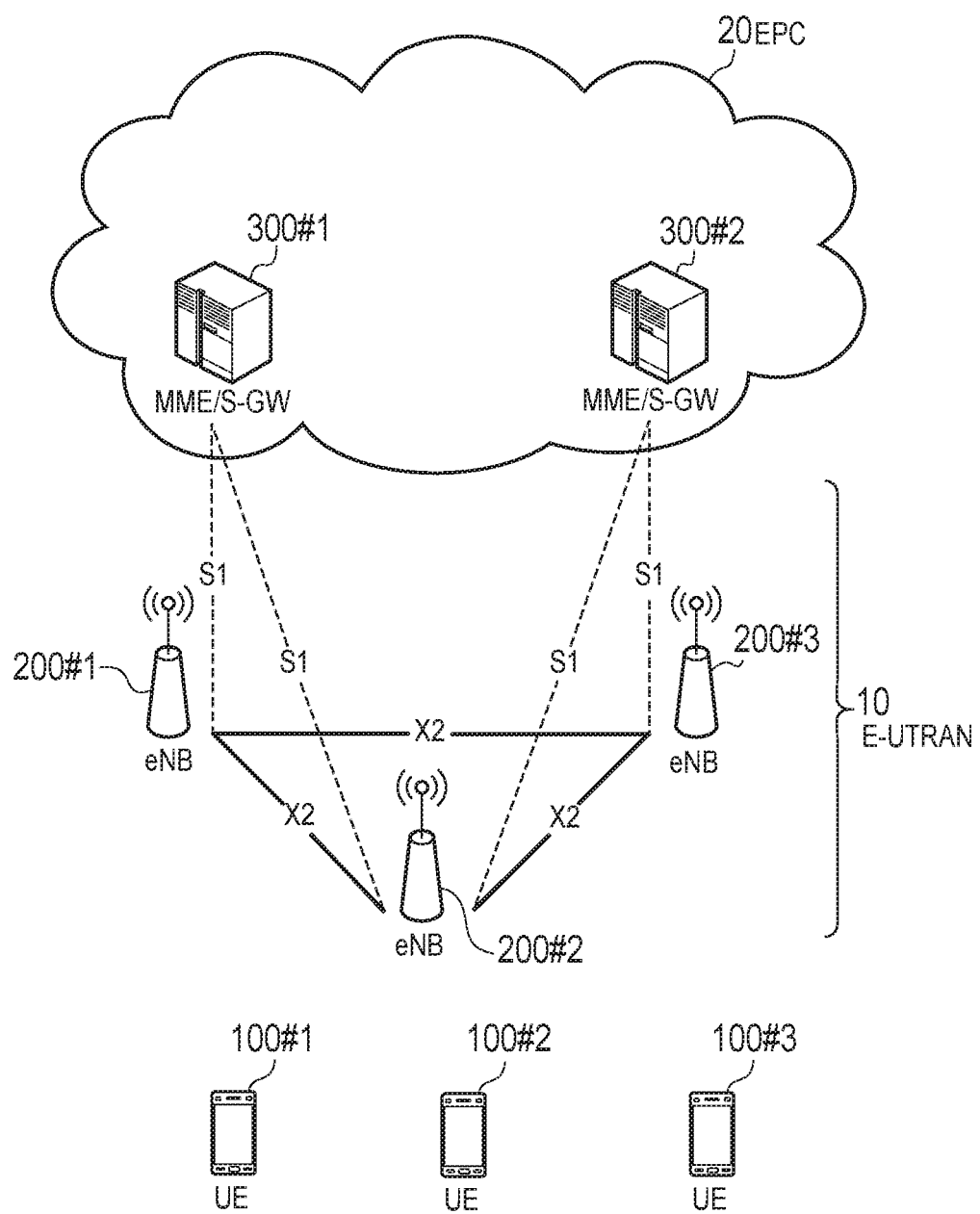
FIG. 1 is a configuration diagram of an LTE system according to an embodiment.

Hereinafter, a mobile communication system according to an embodiment will be described with reference to the accompanying drawings. In the following description of the drawings, the same or similar parts are denoted by the same or similar reference numerals.

It should be noted, however, that the drawings are schematic, and ratios of dimensions or the like may be different from actual ones. Therefore, specific dimensions or the like should be determined with reference to the following description. Further, it will be appreciated that parts in which relations or ratios of dimensions are different between the drawings are included.

[Overview of Disclosure]

In the mobile communication system mentioned in the background art, the selection of the target cell to be used as the serving cell is performed on the basis of the quality of the neighbor cell. Therefore, the user terminals located at geographically close positions are likely to select the same cell as the target cell. Further, the geographical distribution of the user terminals is often biased. In other words, there is a possibility that the cell to be used as the serving cell by the user terminal may become biased to the same cell, and there is a possibility that the load distribution of the respective cells is not properly performed.

A user terminal according to an overview of the disclosure includes a controller that selects a target cell to be used as a serving cell from among a plurality of cells operated at different frequencies. The controller measures qualities of neighbor cells adjacent to a current serving cell at a predetermined timing even when a quality of the current serving cell satisfies predetermined quality criteria.

A user terminal according to an overview of the disclosure includes a controller that selects a target cell to be used as a serving cell from among cells having a quality satisfying predetermined quality criteria among a plurality of cells operated at different frequencies. The controller selects the target cell using an identifier allocated to the user terminal.

A user terminal according to an overview of the disclosure includes a controller that selects a target cell to be used as a serving cell from among a plurality of cells operated at different frequencies. The controller determines whether or not reselection of the target cell is performed using a value specific to the user terminal.

According to the user terminal of the overview of the disclosure, it is possible to properly perform the load distribution of the respective cells. In other words, it is possible to appropriately distribute the user terminals in the RRC idle state to the respective cells.

[Embodiment]

An LTE system based on the 3GPP standard will be described below as an example of a mobile communication system.

(System Configuration)

A system configuration of an LTE system according to an embodiment will be described. FIG. 1 is a configuration diagram of an LTE system according to an embodiment.

The LTE system according to the embodiment includes a user equipment (UE) 100, an evolved-UMTS terrestrial radio access network (E-UTRAN) 10, and an evolved packet core (EPC) 20 as illustrated in FIG. 1.

The UE 100 corresponds to a user terminal. The UE 100 is a mobile communication device, and performs radio communication with a cell formed by an evolved Node-B (eNB 200) (a serving cell in a case in which the UE 100 is in an RRC connected state). A configuration of the UE 100 will be described later.

The E-UTRAN 10 corresponds to a radio access network. The E-UTRAN 10 includes the eNB 200. The eNB 200 corresponds to a radio base station. The eNBs 200 are connected to each other via an X2 interface. A configuration of the eNB 200 will be described later.

The eNB 200 forms one or more cells and performs radio communication with the UE 100 that has established a connection with a cell thereof. The eNB 200 has a radio resource management (RRM) function, a user data routing function, a measurement control function for mobility control/scheduling, and the like. In addition to a term indicating a minimum unit of a radio communication area, "cell" is also used as a term indicating a function performing radio communication with the UE 100.

The EPC 20 corresponds to a core network. The EPC 20 includes a mobility management entity (MME)/serving-gateway (S-GW) 300. The MME performs various kinds of mobility control or the like on the UE 100. The S-GW performs user data transfer control. The MME/S-GW 300 is connected to the eNB 200 via an S1 interface. The E-UTRAN 10 and the EPC 20 constitute a network of the LTE system.

Figure 2:
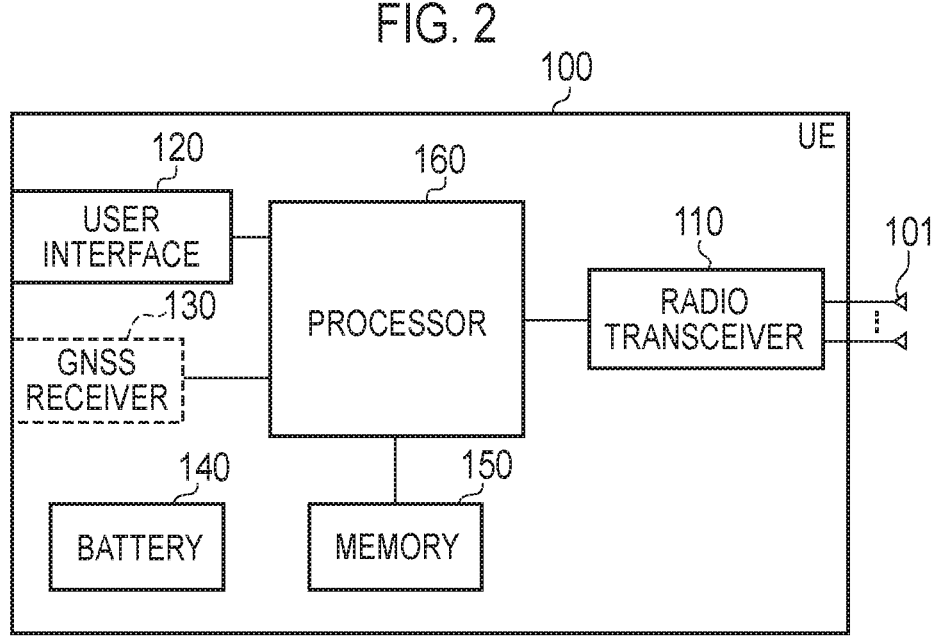
FIG. 2 is a block diagram of a UE according to an embodiment.

FIG. 2 is a block diagram of the UE 100. The UE 100 includes a plurality of antennas 101, a radio transceiver 110, a user interface 120, a global navigation satellite system (GNSS) receiver 130, a battery 140, a memory 150, and a processor 160 as illustrated in FIG. 2. The memory 150 and the processor 160 constitute a controller. The radio transceiver 110 and the processor 160 constitute a transmitter and a receiver. The UE 100 may not include the GNSS receiver 130. Further, the memory 150 may be integrated with the processor 160, and this set (that is, chipset) may be used as a processor.

The antenna 101 and the radio transceiver 110 are used for transmission and reception of radio signals. The radio transceiver 110 converts a baseband signal (a transmission signal) output from the processor 160 into a radio signal and transmits the radio signal from the antenna 101. In addition, the radio transceiver 110 converts a radio signal received by the antenna 101 into a baseband signal (a reception signal) and outputs the baseband signal to the processor 160.

The user interface 120 is an interface with a user who owns the UE 100, and includes, for example, a display, a microphone, a speaker, various buttons, or the like. The user interface 120 receives an operation from the user and outputs a signal indicating content of the received operation to the processor 160. The GNSS receiver 130 receives a GNSS signal and outputs the received GNSS signal to the processor 160 in order to obtain position information indicating a geographical position of the UE 100. The battery 140 stores electric power to be supplied to the blocks of the UE 100.

The memory 150 stores a program executed by the processor 160 and information used for a process performed by the processor 160. The processor 160 includes a baseband processor that performs modulation/demodulation, encoding/decoding, and the like of the baseband signal and a central processing unit (CPU) that performs various kinds of processes by executing the program stored in the memory 150. The processor 160 may further include a codec that encodes and decodes audio and video signals. The processor 160 executes various kinds of processes to be described later and various kinds of communication protocols.

Figure 3:
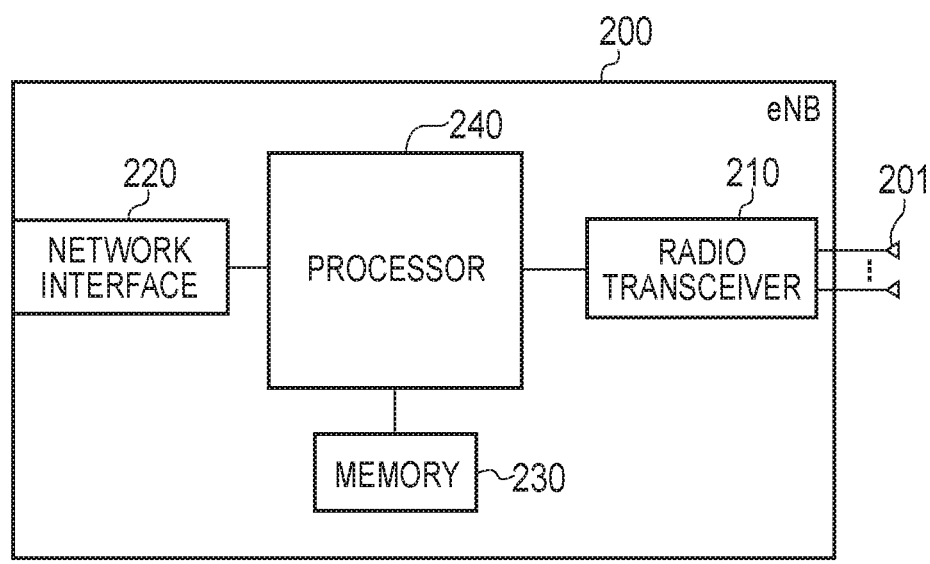
FIG. 3 is a block diagram of an eNB according to an embodiment.

FIG. 3 is a block diagram of the eNB 200. The eNB 200 includes a plurality of antennas 201, a radio transceiver 210, a network interface 220, a memory 230, and a processor 240 as illustrated in FIG. 3. The memory 230 and the processor 240 constitute a controller. The radio transceiver 210 (and/or the network interface 220) and the processor 240 constitute a transmitter and a receiver. Further, the memory 230 may be integrated with the processor 240, and this set (that is, chipset) may be used as a processor.

The antenna 201 and the radio transceiver 210 are used for transmission and reception of radio signals. The radio transceiver 210 converts a baseband signal (a transmission signal) output from the processor 240 into a radio signal and transmits the radio signal from the antenna 201. Further, the radio transceiver 210 converts a radio signal received by the antenna 201 into a baseband signal (a reception signal) and outputs the baseband signal to the processor 240.

The network interface 220 is connected to a neighbor eNB 200 via an X2 interface and connected to the MME/S-GW 300 via an S1 interface. The network interface 220 is used for communication performed on the X2 interface and communication performed on the S1 interface.

The memory 230 stores a program executed by the processor 240 and information used for a process performed by the processor 240. The processor 240 includes a baseband processor that performs modulation/demodulation, encoding/decoding, and the like of the baseband signal and a CPU that performs various kinds of processes by executing the program stored in the memory 230. The processor 240 executes various kinds of processes to be described later and various kinds of communication protocols.

Figure 4:
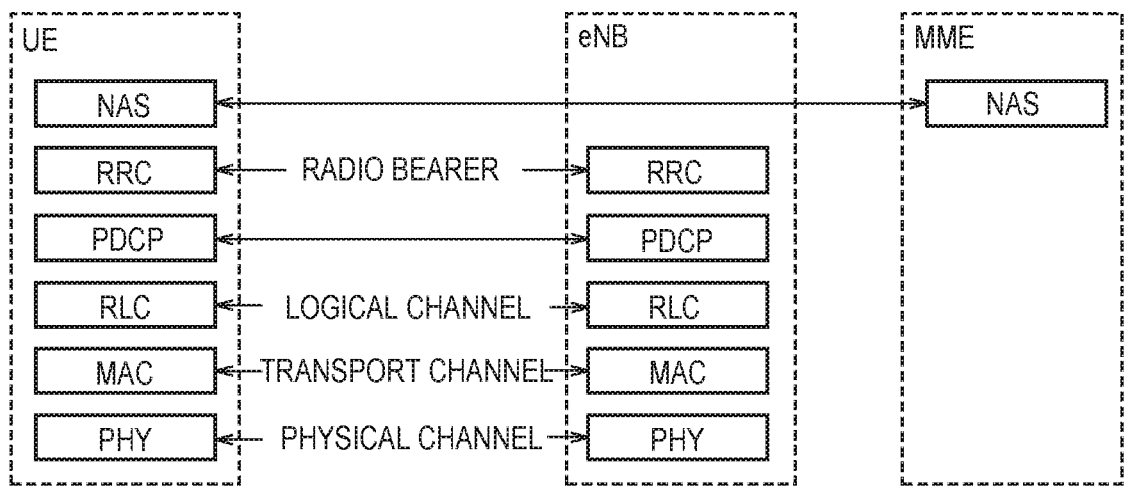
FIG. 4 is a protocol stack diagram of a radio interface according to an embodiment.

FIG. 4 is a protocol stack diagram of a radio interface in the LTE system. As illustrated in FIG. 4, the radio interface protocol is divided into first to third layers of an OSI reference model, and the first layer is a physical (PHY) layer. The second layer includes a medium access control (MAC) layer, a radio link control (RLC) layer, and a packet data convergence protocol (PDCP) layer. The third layer includes a radio resource control (RRC) layer.

The physical layer performs encoding/decoding, modulation/demodulation, antenna mapping/demapping, and resource mapping/demapping. User data and control information are transmitted between the physical layer of the UE 100 and the physical layer of the eNB 200 via the physical channel.

The MAC layer performs priority control of data, a retransmission process by hybrid ARQ (HARQ), a random access procedure, and the like. User data and control information are transmitted between the MAC layer of the UE 100 and the MAC layer of the eNB 200 via the transport channel. The MAC layer of the eNB 200 includes a scheduler that decides uplink and downlink transport formats (a transport block size and a modulation and coding scheme (MCS)) and an allocated resource block for the UE 100.

The RLC layer transmits data to the RLC layer on a reception side using the functions of the MAC layer and the physical layer. User data and control information are transmitted between the RLC layer of the UE 100 and the RLC layer of the eNB 200 via a logical channel.

The PDCP layer performs header compression/decompression and encryption/decryption. Further, it should be noted that a transmitting entity of transmitting a data unit (PDCP PDU) or a receiving entity of receiving a data unit (PDCP PDU) is formed in the PDCP layer.

The RRC layer is defined only on a control plane for dealing with control information. A control signal (an RRC message) for various kinds of settings is transmitted between the RRC layer of the UE 100 and the RRC layer of the eNB 200. The RRC layer controls logical channels, transport channels, and physical channels in accordance with establishment, re-establishment, and release of a radio bearer. In a case in which there is a connection (RRC connection) between the RRC of the UE 100 and the RRC of the eNB 200, the UE 100 is in an RRC connected state, and in a case in which there is no connection (RRC connection) between the RRC of the UE 100 and the RRC of the eNB 200, the UE 100 is in an RRC idle state.

A non-access stratum (NAS) layer located above the RRC layer performs session management, mobility management, and the like.

Figure 5:
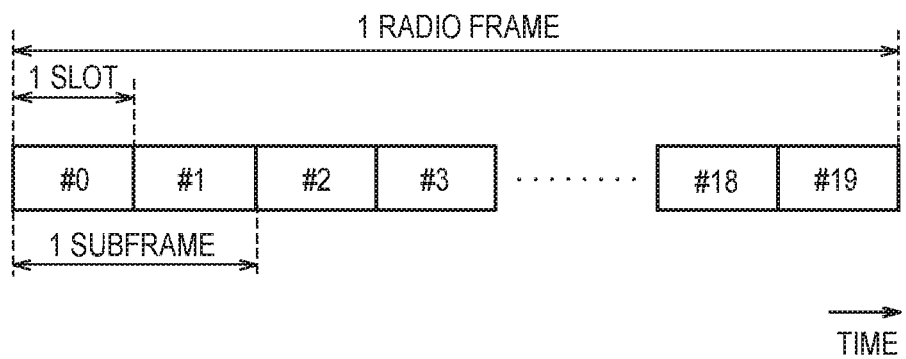
FIG. 5 is a configuration diagram of a radio frame used in an LTE system according to an embodiment.

FIG. 5 is a configuration diagram of a radio frame used in the LTE system. In the LTE system, orthogonal frequency division multiple access (OFDMA) is applied to downlink, and Single Carrier Frequency Division Multiple Access (SC-FDMA) is applied to uplink.

As illustrated in FIG. 5, the radio frame includes ten subframes arranged in a time direction. Each subframe includes two slots arranged in the time direction. A length of each subframe is 1 ms, and a length of each slot is 0.5 ms. Each subframe includes a plurality of resource blocks (RB) in a frequency direction and includes a plurality of symbols in a time direction. Each resource block includes a plurality of subcarriers in the frequency direction. One resource element (RE) is constituted by one symbol and one subcarrier. Among the radio resources (time/frequency resources) allocated to the UE 100, frequency resources are able to be specified by resource blocks, and time resources is able to be specified by subframes (or slots).

(Application Scene)

Figure 6:
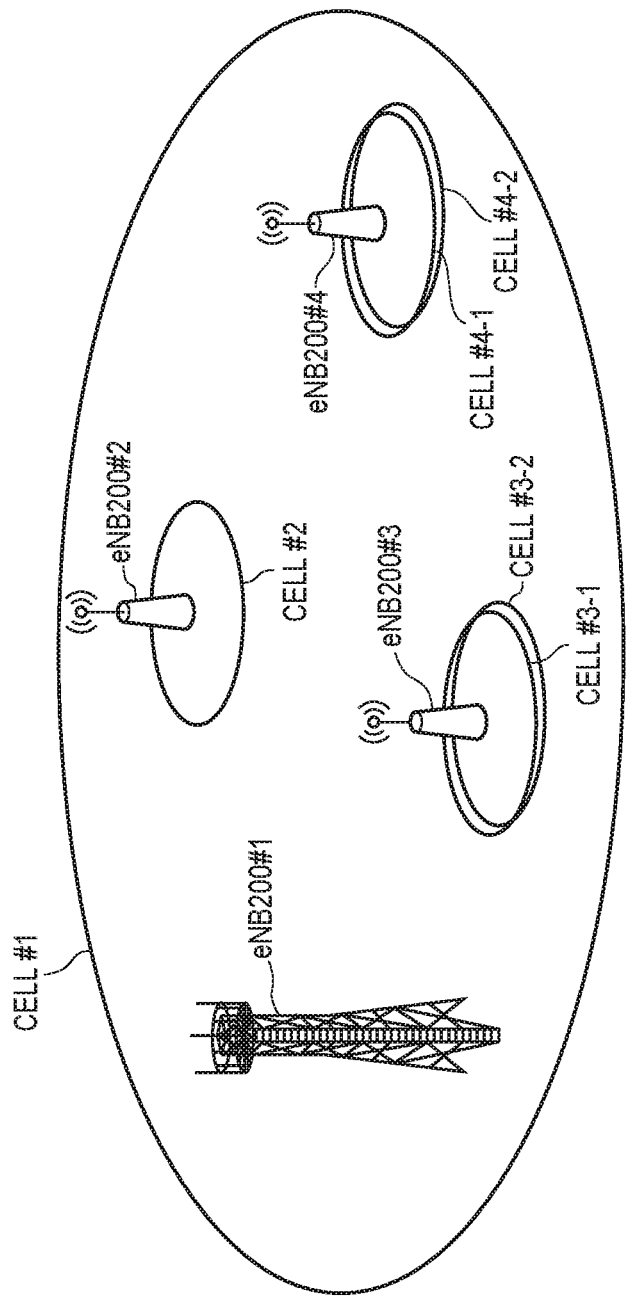
FIG. 6 is a diagram for describing an application scene according to an embodiment.

An application scene will be described below. FIG. 6 is a diagram for describing an application scene according to an embodiment.

A plurality of eNBs 200 (for example, an eNB 200#1, an eNB 200#2, an eNB 200#3, and an eNB 200#4) are provided as illustrated in FIG. 6. The eNB 200#1 includes a cell #1 as a radio communication area, the eNB 200#2 includes a cell #2 as the radio communication area, the eNB 200#3 includes a cell #3-1 and a cell #3-2 as the radio communication area, and the eNB 200#4 includes a cell #4-1 and a cell #4-2 as the radio communication area.

The cell #2, the cell #3-1, the cell #3-2, the cell #4-1, and the cell #4-2 overlap the cell #1. Further, the respective cells are operated at different frequencies. A priority is given to a frequency at which each cell is operated. A correspondence relation between the frequency and the priority is included in system information (system information block (SIB)) transmitted from the eNB 200.

Under this assumption, the UE 100 selects a target cell to be used as a serving cell from among a plurality of cells operated at different frequencies. Specifically, in a case in which a start condition is satisfied, the UE 100 measures qualities of neighbor cells adjacent to a current serving cell and selects a target cell to be used as a serving cell from cells satisfying a selection condition.

Firstly, the start condition is as follows.

(A1) A frequency having a higher priority than a priority of a frequency of a current serving cell The UE 100 constantly measures a quality of the frequency having the high priority.

(A2) A frequency having a priority equal to or lower than a priority of a frequency of a current serving cell The UE 100 measures a quality of the frequency having the priority equal to or lower than the priority of the frequency of the current serving cell in a case in which the quality of the current serving cell is lower than a predetermined threshold value.

Secondly, the selection condition is as follows.

(B1) The priority of the frequency of the neighbor cell is higher than the priority of the current serving cell The UE100 selects a cell satisfying a relation of $Squal>Thresh_{X,HighQ}$ over a predetermined period ($Treselection_{RAT}$) or a cell satisfying a relation of $Srxlev>Thresh_{X,HighP}$ over a predetermined period ($Treselection_{RAT}$) as a target cell. In this case, criteria that the neighbor cell has to satisfy is also referred to as "S-criteria."

Here, Squal indicates a cell selection quality level and is calculated by $Squal=Q_{qualmeas}-(Q_{qualmin}+Q_{qualminoffset})-Qoffset_{temp}$. $Q_{qualmeas}$ indicates a quality level (RSRQ) of the neighbor cell, $Q_{qualmin}$ indicates a minimum required quality level, $Q_{qualmin\ offset}$ indicates a predetermined offset which is constantly applied to the neighbor cell, and $Qoffset_{temp}$ indicates an offset which is temporarily applied to the neighbor cell. $Thresh_{X,HighQ}$ indicates a predetermined threshold value.

Further, Srxlev indicates a cell selection reception level and is calculated by $Srxlev=Q_{rxlevmeas}-(Q_{rxlevmin}+Q_{rxlevminoffset})-Pcompensation-Qoffset_{temp}$. $Q_{rxlevmeas}$ indicates a reception level (RSRP) of the neighbor cell, $Q_{rxlevmin}$ indicates a minimum request reception level, $Q_{rxlevmin}$ offset indicates a predetermined offset which is constantly applied to the neighbor cell, Pcompensation is a parameter related to an uplink capability, and $Qoffset_{temp}$ indicates an offset which is temporarily applied to the neighbor cell. $Thresh_{X,HighP}$ indicates a predetermined threshold value.

(B2) The priority of the frequency of the neighbor cell is equal to the priority of the current serving cell The UE100 calculates a ranking $R_s$ of the current serving cell and a ranking $R_n$ of the neighbor cell, and selects a cell having a higher ranking $R_n$ than the ranking $R_s$ over a predetermined period ($Treselection_{RAT}$) as a target cell. In this case, criteria that the neighbor cell has to satisfy is also referred to as "R-criteria."

Here, $R_s$ is calculated by $R_s=Q_{meas,s}+Q_{Hyst}-Qoffset_{temp}$. $R_n$ is calculated by $R_n=Q_{meas,n}-Qoffset-Qoffset_{temp}$. $Q_{meas,s}$ indicates a reception level (RSRP) of the current serving cell, and $Q_{meas,n}$ indicates a reception level (RSRP) of the neighbor cell. $Q_{Hyst}$ indicates a hysteresis value for causing the current serving cell to be more likely to be reselected as the target cell. $Qoffset_{temp}$ indicates an offset which is temporarily applied to the current serving cell and the neighbor cell.

(B3) The priority of the frequency of the neighbor cell is lower than the priority of the current serving cell The UE100 selects one of neighbor cells as the target cell through a technique similar to (B1) under the assumption that $Squal<Thresh_{Serving,LowQ}$ is satisfied over a predetermined period ($Treselection_{RAT}$), or $Srxlev<Thresh_{Serving,LowP}$ is satisfied over a predetermined period ($Treselection_{RAT}$).

Here, $Thresh_{Serving,LowQ}$ and $Thresh_{Serving,LowP}$ are predetermined threshold values, similarly to $Thresh_{X,HighQ}$ and $Thresh_{X,HighP}$.

Further, various kinds of parameters used in the selection of the target cell are included in system information (system information block (SIB)) transmitted from the eNB 200. Various kinds of parameters include a priority of a frequency (cellReselectionPriority), a predetermined period ($Treselection_{RAT}$), various kinds of offsets ($Q_{qualmin\ offset}$, $Q_{rxlevmin\ offset}$, $Qoffset_{temp}$, $Q_{Hyst}$, and Qoffset), various kinds of threshold values ($Thresh_{X,HighQ}$, $Thresh_{X,HighP}$, $Thresh_{Serving,LowQ}$, $Thresh_{Serving,LowP}$).

In the embodiment, the UE 100 (the controller) selects the target cell to be used as the serving cell from a plurality of cells operated at different frequencies. Specifically, even when the quality of the current serving cell satisfies predetermined quality criteria, the UE100 (controller) measures the quality of the neighbor cell adjacent to the current serving cell at a predetermined timing. Here, "the predetermined quality criteria is satisfied" means that the start condition is not satisfied. In detail, the predetermined quality criteria is a condition in which the quality of the current serving cell is not lower than a predetermined threshold value as described above in (A2).

In other words, in principle, the UE 100 (the controller) according to the embodiment is configured not to start the quality measurement for the neighbor cell adjacent to the current serving cell in a case in which the quality of the current serving cell satisfies the predetermined quality criteria. However, it should be noted that the UE 100 (the controller) exceptionally starts the quality measurement for the neighbor cell on the basis of the system information received from the current serving cell as will be described later.

Here, the UE 100 (the controller) specifies a predetermined timing on the basis of the system information (system information block (SIB)) received from the current serving cell. The "predetermined timing" indicates a timing at which the quality measurement for the neighbor cell is started as the target cell is selected.

The system information may mean that the quality measurement for the neighbor cell is immediately started. In this case, the UE 100 (the controller) specifies a timing at which the system information is received as the predetermined timing and starts the quality measurement for the neighbor cell in response to the reception of the system information.

Alternatively, the system information may include a subframe number from which the quality measurement for the neighbor cell is started. The UE 100 (the controller) specifies a subframe number included in the system information as the predetermined timing and starts the quality measurement for the neighbor cell from the specified subframe number.

Alternatively, the system information may include information indicating a period of the predetermined timing. For example, the system information contains a timer value to be set in a timer started at a timing at which the quality measurement for the neighbor cell ends. The UE 100 (the controller) specifies a timing at which the timer in which the timer value is set expires as the predetermined timing, and starts the quality measurement for the neighbor cell at the specified timing.

Here, in a case in which the system information includes the information indicating the period of the predetermined timing, the UE 100 (the controller) may correct the period of the predetermined timing on the basis of a value specific to the UE 100. The value specific to the UE 100 may be, for example, a subframe number for receiving the system information or an identifier (UE-ID) of the UE 100. The UE 100 (the controller) sets a value obtained by "timer value×UE-ID" in the timer and starts the quality measurement for the neighbor cell at a timing at which the timer expires.

Alternatively, the system information may include a threshold value to be compared with a random number generated by the UE 100 (the controller). The UE 100 (the controller) measures the quality of the neighbor cell on the basis of a comparison result between the random number and a threshold value at a predetermined timing. For example, the UE 100 (the controller) starts the quality measurement for the neighbor cell in a case in which a condition that the random number is larger than the threshold value or the random number is smaller than the threshold value at a predetermined timing is satisfied.

(Mobile Communication Method)

Figure 7:
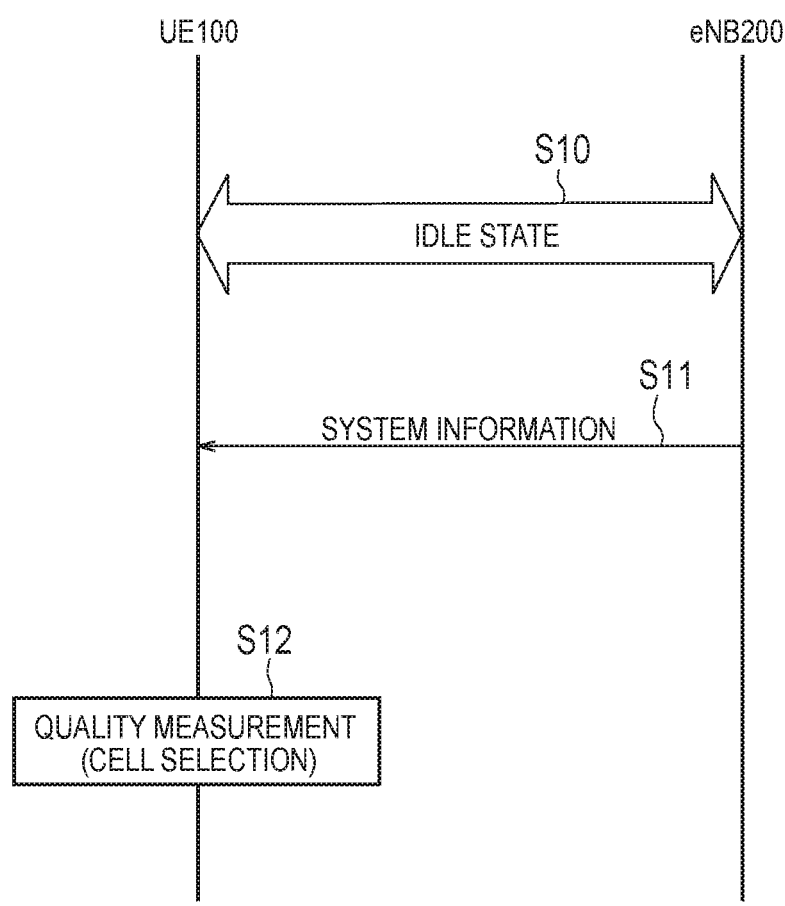
FIG. 7 is a sequence diagram illustrating a mobile communication method according to an embodiment.

A mobile communication method according to the embodiment will be described below. FIG. 7 is a sequence diagram illustrating a mobile communication method according to the embodiment.

As illustrated in FIG. 7, in step S10, the UE 100 is in the RRC idle state.

In step S11, the UE 100 receives the system information (system information block (SIB)) transmitted from the eNB 200 (current serving cell).

In step S12, the UE 100 measures the quality of the neighbor cell adjacent to the current serving cell at a predetermined timing even when the quality of the current serving cell satisfies the predetermined quality criteria. The UE 100 specifies the predetermined timing on the basis of the system information (system information block (SIB)).

(Operations and Effects)

The UE 100 (the controller) according to the embodiment measures the quality of the neighbor cell adjacent to the current serving cell at a predetermined timing even when the quality of the current serving cell satisfies the predetermined quality criteria. In other words, even in the case of the UEs 100 which are located at geographically close positions, timings at which the quality measurement for the neighbor cell is started as the target cell is selected are temporally discrete. Therefore, it is possible to appropriately distribute a load of each cell. In other words, the UEs 100 in the RRC idle state can be appropriately distributed to the respective cells.

[First Modified Example]

A first modified example of the embodiment will be described below. The description will proceed focusing on differences with the embodiment.

Specifically, in the embodiment, the UE 100 measures the quality of the neighbor cell adjacent to the current serving cell at a predetermined timing even when the quality of the current serving cell satisfies the predetermined quality criteria. On the other hand, in the first modified example, the UE 100 (the controller) selects the target cell to use as the serving cell from among cells having a quality that satisfies the predetermined quality criteria (S-criteria or R-criteria) as described above in (B1) to (B3) in the embodiment. The UE 100 (the controller) selects the target cell using a randomization value in the selection of the target cell.

Preferably, the value for randomizing is not a value common to all the UEs 100 existing in the current serving cell. For example, the value for randomizing is one or more values selected from an identifier (UE-ID) allocated to the UE 100, a random number generated by the UE 100 (the controller), and an access class (AC) related to access restriction of the UE 100.

Here, the UE 100 (the controller) may correct the quality (for example, Squal, Srxlev, $Q_{meas,s}$, and $Q_{meas,n}$) on the basis of the randomization value (for example, the UE-ID, the random number, or the AC). For example, as a quality correction method, new values may be defined as various kinds of offsets ($Q_{qualmin\ offset}$, $Q_{rxlevmin\ offset}$, $Qoffset_{temp}$, $Q_{Hyst}$, and Qoffset), or new offsets may be introduced. For example, various types of offsets are calculated by offset= (default offset)×(UE-ID÷n). Here, "n" is a predetermined value or a value transmitted from the serving cell.

Alternatively, the UE 100 (the controller) may correct the priority of the frequency (cellReselectionPriority) in which each of a plurality of cells is operated on the basis of the randomization value (for example, the UE-ID, the random number, or the AC).

Alternatively, the UE 100 (the controller) may select the target cell from among cells having the quality satisfying the predetermined quality criteria (S-criteria or R-criteria) on the randomization value (for example, the UE-ID, the random number, or the AC). In other words, the UE 100 (the controller) specifies the cells having the quality satisfying the predetermined quality criteria (S-criteria or R-criteria) and selects the target cell among the specified cells. For example, the UE 100 (the controller) corrects the ranking of the selection candidate cell on the basis of the randomization value.

Alternatively, the UE 100 (the controller) may select the target cell from among cells operated at the frequency having the same priority as the frequency of the current serving cell on the basis of the randomization value. Here, the frequency having the same priority as the frequency of the current serving cell may be the same frequency as the frequency of the current serving cell or may be different from the frequency of the current serving cell. In other words, the UE 100 (the controller) specifies the cells satisfying the above-described condition and selects the target cell on the basis of the randomization value from among the specified cells (selection candidate cells). For example, the UE 100 (the controller) corrects the ranking of the selection candidate cell on the basis of the randomization value.

Alternatively, the UE 100 (the controller) may select the target cell on the basis of the randomization value from among cells having a quality of a predetermined range. Here, the predetermined range is preferably included in the system information (system information block (SIB)) transmitted from the current serving cell. In other words, the UE 100 (the controller) may specify the cell having the quality of the predetermined range, select the target cell from among the specified cells (selection candidate cells) on the basis of the randomization value. The quality of the predetermined range may be a quality whose difference with the highest quality falls within the predetermined range (for example, within 5 dB) or may be a quality of a cell having a ranking of a predetermined range (for example, top three) in the descending order of rankings. For example, the UE 100 (the controller) corrects the ranking of the selection candidate cell on the basis of the randomization value.

For example, the ranking of the cell may be corrected as follows. In a case in which the random number is used as the randomization value, the ranking of the cell is changed using a function of Roundup {RAND×(the number of selection candidate cells)}. Alternatively, in a case in which the UE-ID is used as the randomization value, the cell which has the highest ranking among the selection candidate cells and satisfies a relation of (UE ID)mod(Cell ID)<n is selected as the target cell. Here, "n" is a predetermined value or a value transmitted from the serving cell.

(Mobile Communication Method)

Figure 8:
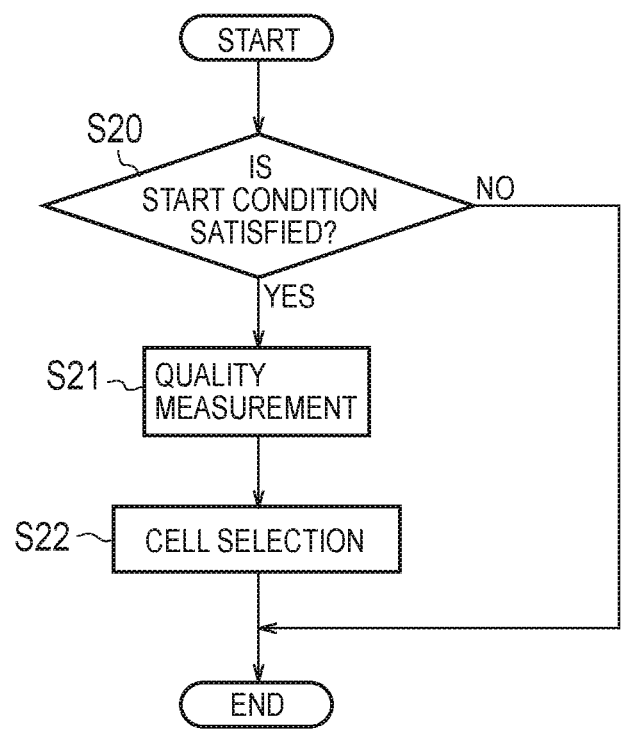
FIG. 8 is a flowchart illustrating a mobile communication method according to a first modified example.

A mobile communication method according to the first modified example will be described below. FIG. 8 is a flowchart illustrating the mobile communication method according to the first modified example. The flow illustrated in FIG. 8 is performed by the UE 100.

As illustrated in FIG. 8, in step S20, the UE 100 determines whether or not the start condition for starting the measurement of the quality of the neighbor cell adjacent to the current serving cell is satisfied. In a case in which a determination result is YES, the UE 100 performs a process of step S21. On the other hand, in a case in which the determination result is NO, the UE 100 ends a series of processes.

As described above, the start condition is as follows.

(A1) A frequency having a higher priority than a priority of a frequency of a current serving cell The UE 100 constantly measures a quality of the frequency having the high priority.

(A2) A frequency having a priority equal to or lower than a priority of a frequency of a current serving cell The UE 100 measures a quality of the frequency having the priority equal to or lower than the priority of the frequency of the current serving cell in a case in which the quality of the current serving cell is lower than a predetermined threshold value.

Here, in step S20, as described above, the priority of the frequency (cellReselectionPriority) may be corrected on the basis of the randomization value (for example, the UE-ID, the random number, or the AC).

In step S21, the UE 100 measures the quality of the neighbor cell adjacent to the current serving cell.

Here, in step S21, as described above, the quality (for example, Squal, Srxlev, $Q_{meas,s}$, and $Q_{meas,n}$) may be corrected on the basis of the randomization value (for example, the UE-ID, the random number, or the AC).

In step S22, the UE 100 selects the target cell to be used as the serving cell from among the cells (selection candidate cells) having the quality satisfying the predetermined quality criteria (S-criteria and R-criteria).

Here, in step S22, as described above, the ranking of the selection candidate cell may be corrected on the basis of the randomization value (for example, the UE-ID, the random number, or the AC).

In the description of FIG. 8, only a part of the first modified example is illustrated, but it should be noted that it is preferable for the UE 100 to select the target cell using the randomization value as described above.

(Operations and Effects)

The UE 100 (the controller) according to the first modified example selects the target cell using the randomization value. In other words, even in the case of the UEs 100 which are located at geographically close positions, the cell selected as the target cell varies. Therefore, it is possible to appropriately distribute the load of each cell. In other words, it is possible to appropriately distribute the UEs 100 in the RRC idle state to the respective cells.

[Second Modified Example]

A second modified example of the embodiment will be described below. The description will proceed with differences with the embodiment.

Specifically, in the embodiment, the UE 100 measures the quality of the neighbor cell adjacent to the current serving cell at a predetermined timing even when the quality of the current serving cell satisfies the predetermined quality criteria. On the other hand, in the second modified example, as described above (B1) to (B3) in the embodiment, the UE 100 (the controller) selects the target cell to be used as the serving cell from among the cells having the quality satisfying the predetermined quality criteria (S-criteria or R-criteria). The UE 100 (the controller) selects the target cell on the basis of a different reselection parameter for each group including one or more UEs 100.

Here, a group to which the UE 100 belongs is designated through a message (for example, an RRC Connection Release) used in a transition procedure from the connected state to the idle state. The message (for example, the RRC Connection Release) may include group identification information identifying the group to which the UE 100 belongs.

Further, the reselection parameter includes a parameter of a frequency (cellReselectionPriority), a predetermined period (Treselection$_{RAT}$), various kinds of offsets ($Q_{qualmin\ offset}$, $Q_{rxlevmin\ offset}$, Qoffset$_{temp}$, $Q_{Hyst}$, and Qoffset), and various kinds of threshold values (Thresh$_{X,HighQ}$, Thresh$_{X,HighP}$, Thresh$_{Serving,LowQ}$, and Thresh$_{Serving,LowP}$).

In the second modified example, the reselection parameter is preferably included in the system information (system information block (SIB)) transmitted from the current serving cell. In other words, a cell that transmits the reselection parameter may be different from a cell that transmits a message (for example, the RRC Connection Release). Here, the reselection parameter may be included in a message (for example, the RRC Connection Release).

Here, the UE 100 (the controller) may maintain the group to which the UE 100 belongs until transition from the RRC idle state to the RRC connected state is performed. In other words, the group to which the UE 100 belongs is released by the transition from the RRC idle state to the RRC connected state. Alternatively, the UE 100 (the controller) may maintain the group to which the UE 100 belongs until a timer activated by receipt of the message (for example, the RRC Connection Release) expires. In other words, the group to which the UE 100 belongs may be released in a case in which a timer started by designation of a group expires.

The group including one or more UEs 100 may be formed by one or more pieces of information selected from a category of the UE 100 (the magnitude of a throughput), a capability of the UE 100 (the number of streams of MIMO or the like), statistics related to traffic of the UE 100 (S1 Initial UE Context Setup), statistics related to mobility of the UE 100 (S1 Initial UE Context Setup), and position information of the UE 100 (including the measurement report).

Alternatively, the group including one or more UEs 100 may be formed by the access class (AC) related to the access restriction of the UE 100. In other words, the reselection parameter differs according to each access class related to the access restriction of the UE 100.

(Mobile Communication Method)

Figure 9:
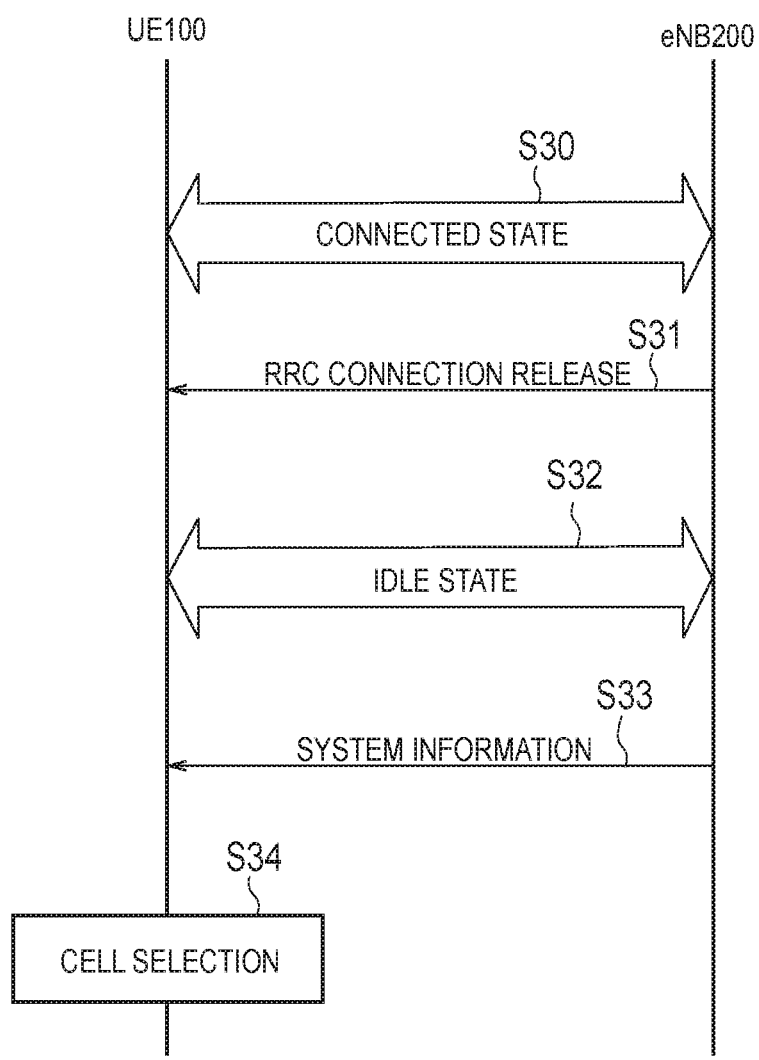
FIG. 9 is a sequence diagram illustrating a mobile communication method according to a second modified example.

A mobile communication method according to the second modified example will be described below. FIG. 9 is a sequence diagram illustrating the mobile communication method according to the second modified example.

As illustrated in FIG. 9, in step S30, the UE 100 is in the RRC connected state.

In step S31, the UE 100 receives the message (RRC Connection Release) used in the transition procedure from the connected state to the idle state. The message (RRC Connection Release) designates the group to which the UE 100 belongs.

In step S32, the UE 100 is in the RRC idle state.

In step S33, the UE 100 receives the system information (system information block (SIB)) transmitted from the eNB 200 (the current serving cell). The system information includes a different reselection parameter for each group including one or more UEs 100.

A cell that transmits the reselection parameter may be different from a cell that transmits the message (for example, the RRC Connection Release).

In step S34, the UE 100 selects the target cell on the basis of the reselection parameter allocated to the group to which the UE 100 belongs.

(Operations and Effects)

The UE 100 (the controller) according to the second modified example selects the target cell on the basis of the different reselection parameter for each group including one or more UEs 100. In other words, even in the case of the UEs 100 which are located at geographically close positions, the cell selected as the target cell varies for each group. Therefore, it is possible to appropriately distribute the load of each cell. In other words, it is possible to appropriately distribute the UEs 100 in the RRC idle state to the respective cells.

[Third Modified Example]

A third modified example of the embodiment will be described below. The description will proceed with differences with the first modified example.

In the first modified example, the case in which the UE 100 (the controller) corrects the ranking of the selection candidate cell on the basis of the randomization value has been described. On the other hand, in the third modified example, another selection method will be described as the target cell selection method based on the randomization value.

Specifically, the UE 100 (receiver) receives the system information including a threshold value to be compared with a random number generated by the controller. The UE 100 (the controller) selects the target cell on the basis of a comparison result between the random number and the threshold value.

More specifically, as described above, the UE 100 (the controller) calculates the ranking of each of a plurality of cells on the basis of a measurement result of the quality of each of a plurality of cells. The rankings are the ranking $R_s$ of the current serving cell and the ranking $R_n$ of the neighbor cell as described above. The UE 100 (the controller) selects the target cell on the basis of the comparison result between the random number and the threshold value.

In this case, the system information includes a different threshold value for each ranking. The UE 100 (the controller) generates the random number for each ranking and selects the target cell on the basis of the comparison result between the random number of each ranking and the threshold value. The UE 100 (the controller) may compare the random number with the threshold value in the descending order of rankings and select a cell in which the comparison result between the random number and the threshold value satisfies the selection condition as the target cell.

For example, the system information includes information (Ranking_No, Probability) in which the ranking is associated with the threshold value. The information (Ranking_No, Probability) is information such as {Rank 1, 0.6}, {Rank 2, 0.8}, and {Rank 3, 1.0}. {Rank 1, 0.6} indicates that the threshold value associated with Rank 1 is 0.6. Similarly, {Rank 2, 0.8} indicates that the threshold value associated with Rank 2 is 0.8, and {Rank 3, 1.0} indicates that the threshold value associated with Rank 3 is 1.0. Further, a range of the random number generated by the UE 100 (the controller) is 0 to 1. Here, the selection condition that the comparison result between the random number and the threshold value has to satisfy is, for example, a condition that the random number is the threshold value or less.

Firstly, the UE 100 (the controller) determines whether or not a cell of ranking 1 is selected as the target cell. In other words, the UE 100 (the controller) generates a random number for the cell of ranking 1 and determines whether or not the comparison result between the random number and 0.6 satisfies the selection condition. For example, in a case in which the random number is 0.8, the UE 100 (the controller) determines that the selection condition is not satisfied. Therefore, the UE 100 (the controller) continues the selection of the target cell.

Secondly, the UE 100 (the controller) determines whether or not a cell of ranking 2 is selected as the target cell. In other words, the UE 100 (the controller) generates a random number for the cell of ranking 2 and determines whether or not the comparison result between the random number and 0.8 satisfies the selection condition. For example, in a case in which the random number is 0.7, the UE 100 (the controller) determines that the selection condition is satisfied. Therefore, the UE 100 (the controller) selects the cell of ranking 2 as the target cell and ends the selection of the target cell.

According to the target cell selection method, a probability that the cell of ranking 1 will be selected as the target cell is 60%. The probability that the ranking 2 cell will be selected as the target cell is 32% ({1−0.6}×0.8). The probability that the ranking 3 cell will be selected as the target cell is 8% (1−0.6−0.32). As described above, the threshold value included in the system information may be decided so that a cell having a high ranking is more likely to be selected as the target cell. However, the third modified example is not limited to this example, and the threshold value included in the system information may be decided depending on a load or a capability of a cell.

In the third modified example, the case in which the system information includes the information (Ranking_No, Probability) in which the ranking is associated with the threshold value has been described. However, the third modified example is not limited to this example. For example, the system information includes information (Priority, Probability) in which a priority is associated with a threshold value.

In this case, the UE 100 (the controller) generates a random number for each priority and selects the target cell on the basis of a comparison result between the random number and the threshold value for each priority. The UE 100 (the controller) may compare the random number with the threshold value in the descending order of priorities and select the cell in which the comparison result between the random number and the threshold value satisfies the selection condition as the target cell.

The priority may be the priority of the frequency at which the cell is operated or may be a priority specific to the cell.

[Fourth Modified Example]

The fourth modified example of the embodiment will be described below. The description will proceed with difference with the embodiment and the third modified example.

In the fourth modified example, the UE 100 (the controller) triggers (performs or starts, the same hereinafter) an operation (or a procedure, the same hereinafter) of selecting (or reselecting, the same hereinafter) the target cell in accordance with a reference trigger notification which is one of a plurality of trigger notifications transmitted from the current serving cell. Preferably, the reference trigger notification is any one of a plurality of trigger notifications. Here, the reference trigger notification may be some trigger notifications among a plurality of trigger notifications or may be two or more trigger notifications.

Here, the trigger notification may be a notification which is used for directly or indirectly triggering an operation in which the UE 100 selects the target cell in a network (here, current serving cell)-initiated manner and transmitted twice or more within a certain period of time. In other words, the trigger notification may be a notification for instructing the UE 100 to perform an operation of selecting the target cell.

For example, the trigger notification may be the system information (system information block (SIB)) described in the embodiment. The system information described in the embodiment includes information specifying a predetermined timing at which the UE 100 starts quality measurement for the neighbor cell. Therefore, it should be noted that the system information described in the embodiment directly triggers the operation in which the UE 100 selects the target cell.

Alternatively, the trigger notification may be the system information (system information block (SIB)) described in the third modified example. As described above, the system information described in the third modified example includes the threshold value to be compared with the random number. Alternatively, the system information described in the third modified example may include the information (Ranking_No, Probability) in which the ranking is associated with the threshold value. Alternatively, the system information described in the third modified example may include the information (Priority, Probability) in which the priority is associated with the threshold value. In response to the reception of the system information described in the third modified example, the UE 100 (the controller) selects the cell in which the comparison result between the random number and the threshold value satisfies the selection condition as the target cell. Therefore, it should be noted that the system information described in the third modified example indirectly triggers the operation in which the UE 100 selects the target cell.

In this case, each of a plurality of trigger notifications includes a counter value. The UE 100 (the controller) stores the counter value included in the reference trigger notification in a counter in accordance with a trigger (or execution, the same hereinafter) of the operation of selecting the target cell. For example, the UE 100 retains the counter in the memory 150. The UE 100 may accumulate the counter value in the counter each time the UE 100 triggers the operation of selecting the target cell in accordance with the reference trigger notification. In a case in which the counter value included in the trigger notification transmitted from the current serving cell coincides with the counter value stored in the counter, the UE 100 (the controller) does not trigger (prohibits the execution of) the operation of selecting the target cell in accordance with the trigger notification. On the other hand, in a case in which the counter value included in the trigger notification transmitted from the current serving cell does not coincide with the counter value stored in the counter, the UE 100 (the controller) triggers the operation of selecting the target cell. Accordingly, the operation in which the UE 100 selects the target cell is triggered only once in accordance with any one trigger notifications (that is, the reference trigger notification) among the trigger notifications which are transmitted twice or more within a certain period of time. In other words, a situation in which the operation of selecting the target cell is triggered twice or more in accordance with each of a plurality of trigger notifications within a certain period is suppressed. In other words, the UE 100 triggers the operation of selecting the target cell at most once in accordance with one type of trigger notification. The counter value may be a predetermined numerical value (0 to 9 or the like).

Further, the counter value included in each of a plurality of trigger notifications is updated by the current serving cell at the timing at which the UE 100 triggers the operation of selecting the target cell. In other words, the current serving cell transmits the trigger notification including the updated counter value twice or more within a certain period of time at a timing at which the UEs 100 in the RRC idle state are desired to be redistributed to the respective cells.

(Operations and Effects)

Here, if the UE 100 triggers the operation of selecting the target cell twice or more in accordance with each of a plurality of trigger notifications, most of the UEs 100 existing in the current serving cell select the target cell. In other words, most of the UEs 100 select a similar cell as the serving cells, and the UEs 100 in the RRC idle state are not able to be appropriately allocated to the respective cells accordingly.

On the other hand, in the fourth modified example, the UE 100 (the controller) triggers the operation of selecting the target cell in accordance with the reference trigger notification which is one of a plurality of trigger notifications transmitted from the current serving cell. Therefore, it is possible to appropriately distribute the UEs 100 in the RRC idle state to the respective cells.

[Fifth Modified Example]

A fifth modified example of the embodiment will be described below. The description will proceed with differences with the fourth modified example.

In the fourth modified example, the trigger notification is the system information (system information block (SIB)) described in the embodiment or the third modified example. On the other hand, in the fifth modified example, the trigger notification is a reselection request signal for requesting reselection of the target cell.

In the fifth modified example, the UE 100 (the receiver) receives the reselection request signal for requesting the reselection of the target cell from the current serving cell. In response to the reception of the reselection request signal, the UE 100 (the controller) performs the reselection of the target cell. Here, it should be noted that the UE 100 (the controller) starts the quality measurement for the neighbor cell associated with the reselection of the target cell even through the start condition described in (A1) and (A2) is not satisfied.

Here, the current serving cell transmits the reselection request signal in a case in which the load of the current serving cell is a predetermined load or higher. It is preferable for the current serving cell to repetitively transmit the reselection request signal in a period of time in which the load of the current serving cell is a predetermined load or higher. In other words, the UE 100 (the receiver) receives the reselection request signal from the current serving cell in a case in which the load of the current serving cell is a predetermined load or higher. It is preferable for the UE 100 (the receiver) to repeatedly receive the reselection request signal in a period of time in which the load of the current serving cell is a predetermined load or higher.

In the fifth modified example, the reselection request signal includes a reselection parameter for causing the current serving cell to be less likely to be selected as the target cell. The UE 100 (the controller) selects the target cell on the basis of the reselection parameter. Specifically, the reselection parameter may be a parameter of performing designation so that the priority of the frequency of the current serving cell (cellReselectionPriority) is changed to the lowest priority or may be an offset indicating a step number for decreasing the priority of the frequency (cellReselectionPriority) of the current serving cell. Alternatively, the reselection parameter may include various kinds of offsets ($Q_{qualmin\ offset}$, $Q_{rxlevmin\ offset}$, $Qoffset_{temp}$, $Q_{Hyst}$, and Qoffset) and various kinds of threshold values ($Thresh_{X,HighQ}$, $Thresh_{X,HighP}$, $Thresh_{Serving,LowQ}$, and $Thresh_{Serving,LowP}$).

In the fifth modified example, the reselection parameter applied in response to the reception of the reselection request signal may not be included in the reselection request signal but may be included in the system information (system information block (SIB)) transmitted from the current serving cell separately from the reselection request signal. Alternatively, the reselection parameter applied in response to the reception of the reselection request signal may be decided in advance. In this case, the UE 100 (the controller) performs the reselection of the target cell on the basis of the reselection parameter transmitted from the current serving cell or the predetermined reselection parameter in response to the reception of the reselection request signal.

In the fifth modified example, in a case in which the predetermined condition is satisfied even through the UE 100 (the controller) receives the reselection request signal, the UE 100 (the controller) may keep staying in the current serving cell without performing the reselection of the target cell. The "predetermined condition" is a condition related to at least one piece of information of a type of UE 100 (UE class), the priority of the frequency of the current serving cell, a power consumption setting of the UE 100, a period of time elapsed after the previous reselection request signal is received, and a value having randomness.

For example, in a case in which the type (UE class) of UE 100 is machine type communication (MTC) or a dedicated data terminal, since the amount of communication data is small, it is preferable for the UE 100 (the controller) to keep existing in the serving cell without performing the reselection of the target cell.

Alternatively, in a case in which the priority of the frequency of the current serving cell is the highest priority, there is a high possibility that MBMS data is being received or a D2D neighbor service (D2D ProSe) is being provided, it is preferable for the UE 100 (the controller) to keep existing in the current serving cell without performing the reselection of the target cell.

Alternatively, in a case in which the power consumption setting of the UE 100 is a low power consumption setting, in order to suppress the power consumption, it is preferable for the UE 100 (the controller) to keep existing in the current serving cell without performing the reselection of the target cell.

Alternatively, in a case in which a period of time elapsed since the previous reselection request signal is received is less than a predetermined period of time, in order to suppress a ping-pong phenomenon, it is preferable for the UE 100 (the controller) to keep existing in the current serving cell without performing the reselection of the target cell. For example, it is preferable for the UE 100 (the controller) to start a timer at a timing at which the previous reselection request signal is received and not to perform the reselection of the target cell until the timer expires.

Alternatively, in order to suppresses a situation in which a plurality of UEs 100 perform the reselection of target cells at the same time and randomly distribute the UEs 100 to the respective cells, in a case in which the value having the randomness is not a predetermined value, it is preferable for the UE 100 (the controller) to keep existing in the current serving cell without performing the reselection of the target cell. Preferably, the value having the randomness is not a value common to all the UEs 100 existing in the current serving cell. For example, the value having the randomness may be a subframe number (SFN) in which the UE 100 receives the reselection request signal, an identifier (UE-ID) of the UE 100 that receives the reselection request signal, or a random number generated by the UE 100. For example, the UE 100 (the controller) performs the reselection of the target cell in a case in which SFNmodUE-ID (÷n)=0 is satisfied, and the UE 100 (the controller) does not perform the reselection of the target cell in a case in which SFNmodUE-ID (÷n)=0 is not satisfied. Here, "n" is a predetermined value or a value transmitted from the serving cell.

[Sixth Modified Example]

A fifth modified example of the embodiment will be described below. The description will proceed with difference with the embodiment and the first to fifth modified examples.

Specifically, in the embodiment and, the first to fifth modified examples, a signal such as the system information (system information block (SIB)) is transmitted from the current serving cell to the UE 100.

On the other hand, in the sixth modified example, the signal such as the system information transmitted from the current serving cell is transmitted to the UE 100 and transmitted to the neighbor cell (eNB 200) adjacent to the current serving cell (eNB 200) as well. Alternatively, the load state of the current serving cell (eNB 200) is also transmitted to the neighbor cell (eNB 200) adjacent to the current serving cell (eNB 200). The signal such as the system information and the load state are exchanged between cells via the X2 interface connecting two or more eNBs 200. Accordingly, since the signal such as the system information transmitted in each cell (a parameter for encouraging the reselection of target cell) and the load states of the respective cells are shared by the respective cells, it is possible to perform cooperative control of a plurality of cells.

For example, in a case in which all loads of a plurality of cells which are adjacent to one another are high, it is possible to suppress a phenomenon (ping-pong phenomenon) that the reselection of the target cell is frequently performed among a plurality of cells. In detail, in a case in which the signal such as the system information (the parameter for encouraging the reselection of target cell) is transmitted in the neighbor cell or in a case in which the load of the neighbor cell is higher than a threshold value, the current serving cell holds the transmission of the signal such as the system information (the parameter for encouraging the reselection of target cell) to the UE 100.

Here, the signal such as the system information may include the parameter specifying a timing (specific timing) at which the quality measurement for the neighbor cell is started as described above in the embodiment. Alternatively, the signal such as the system information may include the predetermined range which is referred to when the target cell is selected on the basis of the value having the randomness as described above in the first modified example. Alternatively, the signal such as the system information may include the different reselection parameter for each group including one or more UEs 100 as described above in the second modified example. Alternatively, the signal such as the system information may include the threshold value to be compared with the random number generated by the controller as described above in the third modified example. Alternatively, the signal such as the system information may include the trigger notification for encouraging the reselection of the target cell as described above in the fourth modified example. Alternatively, the signal such as the system information may include the reselection request signal for encouraging the reselection of the target cell or the reselection parameter applied in response to the reception of the reselection request signal as described above in the fifth modified example.

[Seventh Modified Example]

A seventh modified example of the embodiment will be described below. The description will proceed with difference with the embodiment.

In the embodiment, the randomization value includes the random number generated by the UE 100 (the controller). On the other hand, in the seventh modified example, the value having the randomness does not include the random number generated by the UE 100 (the controller). Further, the UE 100 determines whether or not the reselection of the target cell is performed using the value having the randomness.

For example, the value having the randomness is a value specific to the UE 100 (UE-ID). The value (UE-ID) specific to the UE 100 may be an identifier allocated by the current serving cell (radio network temporary identifier (RNTI)), an identifier uniquely allocated to the UE 100 in advance (international mobile subscriber identity (IMSI)), or an identifier allocated in accordance with the location registration of the UE 100 (SAE-temporary mobile subscriber identity (S-TMSI)).

In the seventh modified example, the UE 100 determines whether or not the reselection of the target cell is performed on the basis of the value specific to the UE 100 and the value received from the current serving cell. Specifically, the value received from the current serving cell includes a value (Np) defining a probability of the reselection of the target cell and a value (Nr) for securing fairness between the UEs 100. "Np" and "Nr" may be included in announcement information transmitted from the current serving cell. In order to ensure the fairness between the UEs 100, it is preferable to change Nr with a predetermined cycle.

For example, the UE 100 may perform the reselection of the target cell in a case in which a condition of (UE-IDmodNp)=Nr is satisfied. In this case, the UE 100 does not perform the reselection of the target cell in a case in which the condition of (UE-IDmodNp)=Nr is not satisfied. As described above, it is possible to use the RNTI, the IMSI, or the S-TMSI as the UE-ID. Therefore, in the above-mentioned equation, the UE-ID may be replaced with any one of the RNTI, the IMSI, and the S-TMSI.

Here, a timing at which it is determined whether or not the reselection of the target cell is performed using the value having the randomness may be the "predetermined timing" described above in the embodiment. For example, the predetermined timing is specified on the basis of the system information (system information block (SIB)) received from the current serving cell. Further, the "predetermined timing" indicates a timing at which the quality measurement for the neighbor cell is started as the target cell is selected.

As described above in the embodiment, the system information may indicate that the quality measurement for the neighbor cell is immediately started. In this case, the UE 100 specifies a timing at which the system information is received as the predetermined timing and starts the quality measurement for the neighbor cell in response with the reception of the system information.

Alternatively, the system information may include a subframe number from which the quality measurement for the neighbor cell is started. The UE 100 specifies a subframe number included in the system information as the predetermined timing and starts the quality measurement for the neighbor cell from the specified subframe number.

Alternatively, the system information may include information indicating a period of the predetermined timing. For example, the system information contains a timer value to be set in a timer started at a timing at which the quality measurement for the neighbor cell ends. The UE 100 specifies a timing at which the timer in which the timer value is set expires as the predetermined timing, and starts the quality measurement for the neighbor cell at the specified timing.

In the seventh modified example, the case in which the value (Nr) for securing the fairness between the UEs 100 is included in the announcement information transmitted from the current serving cell has been described. However, the seventh modified example is not limited to thereto. For example, a frame number or a subframe number including a predetermined timing may be used as "Nr." For example, in a case in which the system information indicates that the quality measurement for the neighbor cell is immediately started, a frame number or a subframe number in which the system information is received is used as "Nr." Alternatively, in a case in which the system information includes a subframe number from which the quality measurement for the neighbor cell is started, a frame number or a subframe number from the quality measurement for the neighbor cell is started is used as "Nr."

Alternatively, a value (systemInfoValueTag) incremented with the update of the contents of the system information (SIB) may be used as the value (Nr) for securing the fairness between the UEs 100. systemInfoValueTag is included in the announcement information (SIB 1) transmitted from the current serving cell.

It is preferable to select the value of "Nr" so that the relation of Nr<Np is satisfied. Alternatively, the UE 100 may perform the reselection of the target cell in a case in which the condition of (UE-IDmodNp)=(NrmodNp) is satisfied. In this case, the UE 100 does not perform the reselection of the target cell in a case in which the condition of (UE-IDmodNp)=(NrmodNp) is not satisfied.

Here, the UE 100 may perform the reselection of the target cell in a case in which one or more conditions selected from three types of conditions (UE-IDmodNp)>(NrmodNp), (UE-IDmodNp)<(NrmodNp), and (UE-IDmodNp)=(NrmodNp) are satisfied. One or more conditions (that is, an equality sign or an inequality sign in the above equations) selected from the three types of conditions may be included in the announcement information transmitted from the current serving cell.

Alternatively, a plurality of values Nr (for example, Nr1 and Nr2) may be set as the value (Nr) for securing the fairness between the UEs 100. In this case, the UE 100 may perform the reselection of the target cell in a case in which a condition of (UE-IDmodNp)=(Nr1 modNp) or a condition of (UE-IDmodNp)=(Nr2 modNp) is satisfied.

Alternatively, a plurality of values Np (for example, Np1 and Np2) may be set as the value (Np) defining the probability of the reselection of the target cell. In this case, the UE 100 may perform the reselection of the target cell in a case in which a condition of (UE-IDmodNp1)=(NrmodNp1) or a condition of (UE-IDmodNp2)=(NrmodNp2) is satisfied.

[Other Embodiments]

The present disclosure has been described in accordance with the above-described embodiments, but it should not be understood that the description and the drawings constituting a part of this disclosure limit the present disclosure. Various alternative embodiments, examples, and operational techniques will be apparent to those skilled in the art from this disclosure.

Although not specifically mentioned in the embodiment, the quality measurement for the neighbor cell associated with the selection of the target cell may be started in a case in which a predetermined condition is satisfied at a predetermined timing (the embodiment). Alternatively, the selection of the target cell using the randomization value (the first modified example) may be performed when a predetermined condition is satisfied. For example, the predetermined condition may be a condition that the access class of the UE 100 is an access class transmitted from the current serving cell. Alternatively, the predetermined condition may be a condition that priority modAC=0 of the frequency is satisfied or a condition that cell-IDmodAC=0 is satisfied.

As described above in the embodiment, the entire target cell selection procedure includes (A) the procedure (measurement procedure) of measuring the quality of the neighbor cell adjacent to the current serving cell in a case in which the start condition is satisfied and (B) the procedure (selection procedure) of selecting the target cell to be used as the serving cell from among the cells satisfying the selection condition. The embodiment relates to the measurement procedure, and the first to third modified examples relates to the selection procedure. In this case, the measurement procedure according to the embodiment may be combined with the selection procedure according to any one of the first to third modified examples. Further, the selection procedures according to two or more modified examples selected from the first to third modified examples may be combined.

In the fourth modified example, the case in which the current serving cell causes the UE 100 to trigger the operation of selecting the target cell in accordance with the reference trigger notification which is one of a plurality of trigger notifications using the counter values included in the counter of the UE 100 and the trigger notification has been described. However, the fourth modified example is not limited thereto. Specifically, it is preferable for the UE 100 to trigger the operation of selecting the target cell in response to one trigger notification (reference trigger notification) among trigger notifications transmitted from the current serving cell twice or more within a certain period of time. Therefore, the UE 100 may be configured to activate the timer in accordance with the trigger (or the execution or the start, the same hereinafter) of the operation of selecting the target cell and not to trigger the operation of selecting the target cell even though the trigger notification is received before the timer expires. Preferably, a period of time before the timer expires after the timer is activated is the same to a period of time (the above-described certain period of time) in which the trigger notification is transmitted twice or more. Alternatively, each of a plurality of trigger notifications may include toggle information capable of having two or more values, and the UE 100 (the controller) may store toggle information included in a reference trigger in a storage area in a case in which the operation of selecting the target cell is triggered in accordance with the reference trigger notification. In this case, the UE 100 (the controller) does not trigger the operation of selecting the target cell in a case in which the toggle information included in the trigger notification transmitted from the current serving cell coincides with the toggle information stored in the storage area. On the other hand, the UE 100 (the controller) triggers the operation of selecting the target cell in a case in which the toggle information included in the trigger notification transmitted from the current serving cell does not coincide with the toggle information stored in the storage area.

Although not particularly mentioned in the embodiment, a cell (hereinafter, an overload cell) that transmits the trigger notification such as the parameter for encouraging the reselection of the target cell or the reselection request signal for requesting the reselection of the target cell may be dealt with as follows. Specifically, the UE 100 may exclude the overload cell from the measurement target cell. Alternatively, the UE 100 may exclude the overload cell from the target cell to be used as the serving cell even though the overload cell satisfies the criteria ("S-criteria") that the neighbor cell has to satisfy. Alternatively, the UE 100 may exclude the overloaded cell from the cell having the ranking. Accordingly, the ping-pong phenomenon that the UEs 100 alternately select the neighbor cells as the target cell in a state in which a plurality of neighbor cells are transmitting the trigger notification (for example, a state in which all of a plurality of neighbor cells are high in load) is suppressed.

Although not particularly mentioned in the embodiment, the UE 100 may perform the reselection of the target cell in a case in which the condition that the period of time elapsed since the UE 100 enters the current serving cell exceeds a time threshold value (for example, 1 second) is satisfied. Under this assumption, in a case in which the UE 100 performs the reselection of the target cell in accordance with the trigger notification, it is preferable to use a time threshold value larger than a time threshold value used in the case of performing the reselection of the target cell in accordance with the above-described start condition (A1 or A2). Accordingly, the ping-pong phenomenon that the UEs 100 alternately select the neighbor cells as the target cell in a state in which a plurality of neighbor cells are transmitting the trigger notification (for example, a state in which all of a plurality of neighbor cells are high in load) is suppressed. From the same point of view, in a case in which the UE 100 performs the reselection of the target cell in accordance with the trigger notification, it is preferable to use a predetermined period (Treselection$_{RAT}$) larger than a predetermined period (Treselection$_{RAT}$) used in the case of performing the reselection of the target cell in accordance with the above-described start condition (A1 or A2).

Although not specifically mentioned in the embodiment, a program causing a computer to execute the processes performed by the UE 100 and the eNB 200 may be provided. Further, the program may be recorded on a computer readable medium. It is possible to install the program in the computer using the computer readable medium. Here, the computer readable medium on which the program is recorded may be a non-transitory recording medium. The non-transitory recording medium is not particularly limited and may be, for example, a recording medium such as a CD-ROM or a DVD-ROM.

Alternatively, a chip configured with a memory that stores a program for executing the processes performed by the UE 100 and the eNB 200 and a processor that executes the program stored in the memory may be provided.

In the embodiment, the LTE system has been described as an example of the mobile communication system. However, the embodiment is not limited thereto. The mobile communication system may be systems other than the LTE system.

[Additional Note 1]

(1. Introduction)

The new work item on Multicarrier Load Distribution of UEs in LTE is approved and the objective of this work item is to enhance the cell reselection mechanism in IDLE under up-to-date multicarrier operations.

The WI should first have a study phase to look at:

Limitations of the current mechanisms and measurement quantities for redistribution of UEs amongst multiple LTE carriers.

Based on the analysis of the study phase, the WI should provide solution(s).

To redistribute RRC Idle UEs amongst LTE carriers that minimize the need for load triggered HO or redirection of UE during connected mode.

Carriers with different cell load, bandwidth and capabilities should be considered.

Both homogeneous and heterogeneous deployment scenarios should be considered.

New measurement quantities, e.g. SINR, for better estimation of user throughput should be evaluated and introduced, if needed In this additional note, the potential issues in the cell reselection mechanism for multi-carrier load distribution are identified in support of the study phase.

(Deployment Scenarios)

FIG. 10 illustrates deployment scenarios. The WID and the motivation document point out the examples of multi-carrier deployment scenario, such as homogeneous coverage among multiple carriers (inter-frequency HomoNet), heterogeneous coverage between multiple carriers (inter-frequency HetNet), and the combination of these two scenarios. Although a unified solution applicable to all three scenarios is desirable, scenario-specific solutions should also be considered if significant benefits can be realized. Therefore, any proposed solution should be evaluated based on its applicability to specific deployment scenario(s) and whether it causes degradation (e.g., ping-ponging in reselection) in the non-intended deployment scenarios.

The solutions should be applicable to at least one deployment scenario in inter-frequency HomoNet, inter-frequency HetNet or the combination of the two scenarios, and the solutions should not have negative impact on the non-intended scenarios.

(Limitation in the Existing Cell Reselection Mechanism)

The cell (re)selection parameters are provided by SIBs or dedicated signalling (RRC Connection Reject or RRC Connection Release messages) and the cell reselection procedure is performed in the UE using the parameters. Focusing on normal cell reselection (i.e., without dedicated parameters), SIB3 provides common parameters, while SIB4 provides intra-frequency specific parameters and SIB5 provides inter-frequency specific parameters. With these parameters, the UE performs frequency prioritization according to the cell reselection priority, the measurements of RSRP/RSRQ, the evaluations of the S-criterion, and the ranking of cells with the R-criterion, and then it finds out the most suitable cell to reselect and camp on.

In the prioritization and measurement phase, the UE may not perform intra-frequency measurement when the S-criterion of the serving cell is fulfilled. In addition, the UE may not perform inter-frequency measurement unless the reselection priority of the neighbour frequency is higher than that of the serving frequency or the S-criterion of the serving cell is not fulfilled. It's obvious that the cell resection procedure is not triggered unless the measurement is performed, even if more suitable cell is actually available. It's one of limitations in the current cell reselection procedure and causes lopsided UE distribution in some cases, e.g., "lock-on" with idle mode mobility illustrated in FIG. 11.

In addition, there are exceptions in the prioritization phase. The UE is allowed to deviate from the normal frequency prioritization to selection rule and select a different frequency that provides MBMS services of interest. Moreover, Rel-12 ProSe direct communication introduced a similar rule that "If the UE capable of ProSe direct communication is configured to perform ProSe direct communication and can only perform the ProSe direct communication while camping on a frequency, the UE may consider that frequency to be the highest priority". Therefore, it is likely that cells on frequencies offering MBMS and/or ProSe experience congestion more often than those that do not, if there are many UEs interested in these types of services.

FIG. 11 illustrates "Lock-on" within higher priority frequency.

Note that it is assumed that the cell reselection for inter-RAT and CSG cell is out of the scope of this work item.

RAN2 should consider how load balance may be achieved between a low priority frequency and a high priority frequency with the understanding that the UE is also allowed to prioritize a frequency based on its interest in MBMS and/or ProSe.

In the evaluation and ranking phase, both the S-criterion and the R-criterion use RSRP and RSRQ which are measured by the UE. However, it was pointed out in that RSRQ is not a sufficient metric for determining SINR since RSRQ has a narrow dynamic range and it becomes a non-linear function of SINR above 5 dB and is saturated around 10 dB. However, the throughput is kept almost linear between 0 dB and 30 dB. The limitation with RSRQ measurement is particularly troublesome for higher category UEs (e.g., smartphones) since this may degrade the achievable user throughput. Therefore, in order to maximize achievable user throughput after transitioning to RRC CONNECTED, at least the ranking process using RSRQ is no longer adequate and a new measurement metric, with a better estimate of SINR is desirable.

At least the ranking process for the higher category UEs should be based on a more accurate measurement metric than RSRQ.

Unlike smartphones, the MTC devices with lower UE category don't need too much higher SINR, since the throughput ends up hitting the limits capped by the Maximum number of DL-SCH transport block bits received within a TTI. Especially for such lower category UEs, it should be taken into consideration to avoid unnecessary power consumption due to the increased measurements using the new metric, as stated in the WID. RAN2 should avoid additional power consumption for lower category UEs.

(Potential Issues and Challenges)

In this section, the potential issues, other than the limitations identified in section 2.2, are discussed.

(Potential Capacity (Static)/Cell Load (Dynamic) Awareness Distribution)

Figures 12A, 12B, 12C:
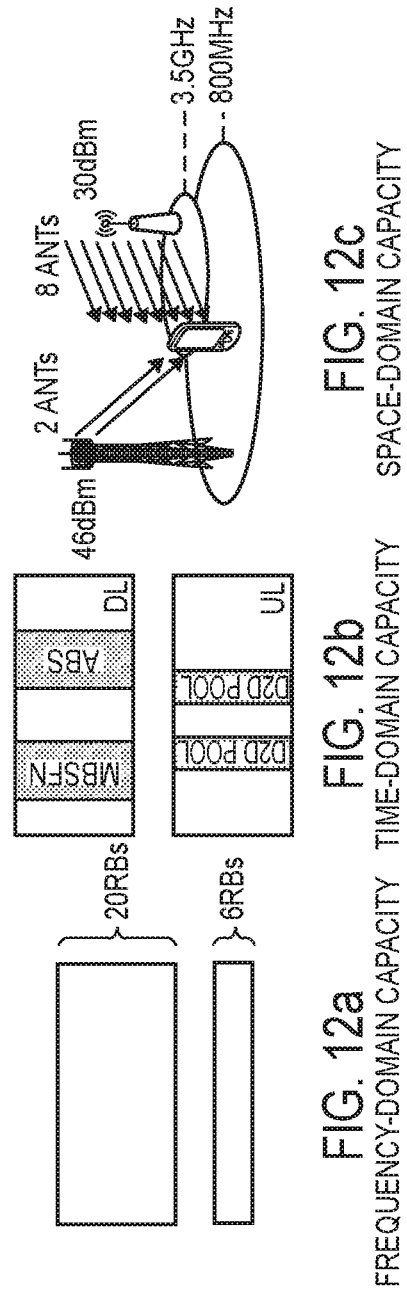
FIGS. 12a to 12c are diagrams according to an additional note of an embodiment.

The potential capacities of frequencies/cells are different since cells have independent configuration of parameters such as bandwidth, CP length, almost blank subframes (ABS), MBSFN subframes, ProSe resource pools, number of antennas and/or cell sizes depending on transmission power of eNB and operating frequency. These can be categorized into frequency-domain, time-domain and space-domain (illustrated in FIG. 12). FIG. 12 illustrates potential capacity and (semi-) static configurations. The potential capacity of a cell may be determined as a function of the above parameters, and since these configurations are typically (semi-) static and are already provided in SIBs, they may be acquired by IDLE UEs through UE implementation or assistance from their serving cells. Since a cell's capacity is directly related to the potential for user throughput UEs should take such cell capacity into account as part of cell reselection.

The cell reselection procedure should take into account the configurations of neighbour cells.

As intended in, more dynamic information such as current cell loads will facilitate more suitable cell reselection;

however, the direct broadcast of load information isn't acceptable by some operators based on previous discussions e.g., Rel-12 WLAN Interworking. As in the case for WLAN Interworking, the cell loads are implicitly provided through the configurations of RAN assistance parameters, i.e., RSRP/RSRQ thresholds. Since a cell's load is an integral part of idle mode UE distribution, it should be considered whether implicit or direct configuration of a cell's load should also be considered for optimizing cell reselection RAN2 should discuss whether it can be acceptable to provide dynamic information such as current cell load to IDLE UEs, directly or implicitly.

(Clustered UE Distribution)

In general, it is well-known that the density of users is not uniform in an area and the user tends to cluster within specific spots, e.g., in a building, on a main street, in a stadium and so on. Therefore, the distribution of UE clusters among multiple carriers within an eNB coverage area may be one of the keys to successful load distribution.

With connected mode UEs, load balancing may be resolved using existing mechanisms such as redirections or handovers. On the other hand, idle mode UEs basically applies the common configuration provided by SIBs. Assuming the clustered UEs experience similar radio conditions, i.e., RSRP and RSRQ, the current cell reselection mechanism cannot split the cluster, i.e., these UEs may reselect based on the same S-criterion/R-criterion. So, even if cell reselection parameters are adjusted by the eNB, it simply results in "mass reselection" and load balancing among multiple carriers cannot be achieved (as illustrated in FIGS. 13a and 13b). FIGS. 13a and 13b illustrate mass reselection of clustered UE. To avoid the mass reselection and achieve better load balancing, it should be possible for a group of UEs within the cluster to select cell(s) that differ from cell(s) selected by other group of UEs within the cluster. It should be further considered whether it would be beneficial for the cells to be reselected using some kind of UE-by-UE randomization scheme. Such a randomization scheme could be based on an acceptable measurement range e.g., Cell Reselection Priority and/or R-criterion, where the measurement range is under control of the eNB. Therefore, RAN2 should consider how to achieve load balance of the clustered UEs.

RAN2 should consider how to achieve load balancing of the clustered UEs among multiple carriers.

[Additional Note 2]

(Introduction)

The discussion on the multi-carrier load distribution WI is started and approved the requirements as follows;

Requirements Targeted in this WI

1) It should be possible under network control to re-distribute among the different carries a fraction of users currently camped on these carriers 2) It should be possible under network control to distribute among the different carries a fraction of users moving into the cells from other cells 3) Different deployment scenarios should be supported— macro only networks, co-channel and inter-frequency small cell deployments 4) It should be possible to control the load distribution among individual cells rather than only on a carrier level (for example the scenario that the macro cell in a co-channel Het-Net deployment and/or certain small cells on another carrier may be overloaded)

5) Solutions should cater for different (re)distribution decisions in the network that take into consideration other factors:

a) eMBMS deployments on macro or small cell layer b) Number of devices supporting certain bands (other capabilities can be considered)

c) Bandwidth of the different carriers may be different

6) The solution should avoid a user ping-pong among carriers

7) Maximize user throughput and network capacity (in terms of system throughput, connection establishment, RA, (inter-frequency) mobility related signalling) for UEs in CONNECTED.

In this additional note, the benefits and shortcomings in the possible solutions with per-cell priorities and/or reselection probabilities are considered.

Discussion (Evaluation Scenario)

As discussed in, it's one of big challenges to solve "mass reselection" scenario due to clustered UE. The scenario is the same with Scenario 2 in. With the current cell reselection mechanism, the UEs which are located in the same geographical area, i.e., experience similar RSRP/RSRQ, cannot be distributed among different carriers under network control. The solutions should be expected to solve this issue.

(Possible Solutions)

The five possible solutions were summarized in, and there are two promising solutions on the agreement that It should be possible to control the load distribution among individual cells rather than only on a carrier level, the cell specific priority (CSP) and the cell specific priority probability (CSPP).

CSP provides a new cell reselection priority for specific cell in addition to the existing cellReselectionPriority for each frequency, and the cell specific priority is applied when the specific cell is ranked the highest on a frequency. The UE is mandated to perform inter-frequency measurement during the cellReselectionPriority is provided.

CSPP provides a new probability (Prs) for UEs to determine whether it should perform cell reselection to a different frequency or stay in the current frequency. And if the probability outcome is such that the UE should select a different frequency then the cell selection priority on is based on the same mechanism as CSP. CSPP will be capable to re-distribute among the different carries a fraction of users currently camped on these carriers, thanks to the probability.

The agreement implies that the serving cell provides an inter-frequency priority list for specific cell(s) based on probability.

(Reselection Priorities Handling Aspects)

As suggested in, CSP and CSPP work well for offloading the idle UEs to the other frequency/cell.

However, both CSP and CSPP need to configure the reselection priority with higher than current frequency and it force the UEs continuous inter-frequency measurement, which results in additional power consumption. To minimize UE power consumption, the load re-distribution mechanism is expected to be done within equal priority frequencies. Furthermore, CSP cannot solve the mass-reselection, i.e., all UEs camped on a cell have to move to the other cell, as also pointed out in.

Proposal: The solutions should work within equal priority frequencies, to avoid unnecessary UE power consumption.

(Measurement Rules for Cell Reselection Aspects)

Figure 14:
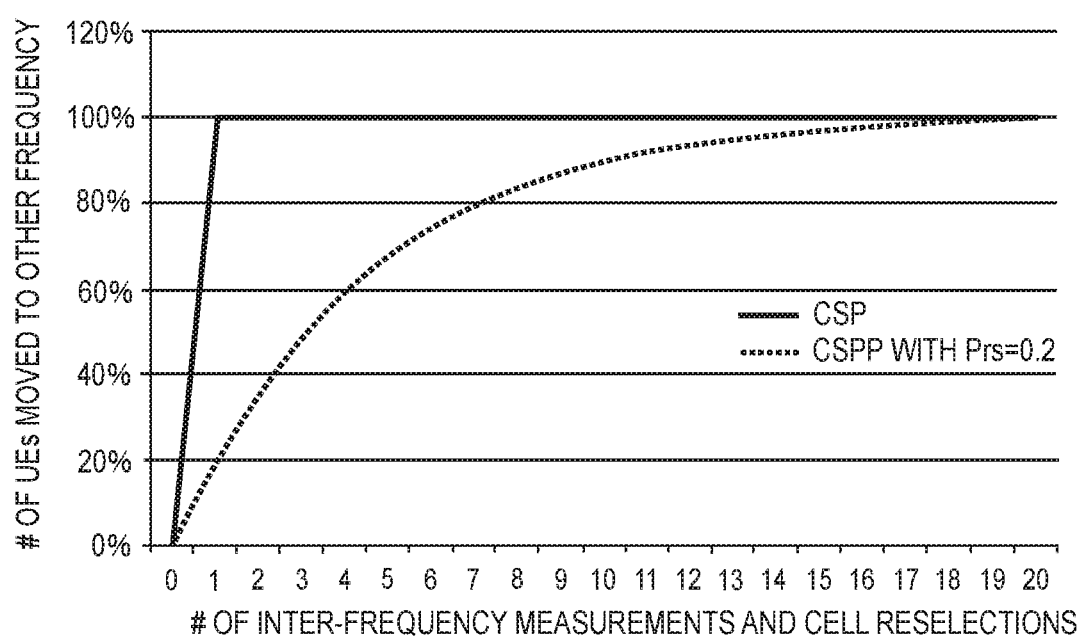
FIG. 14 is a diagram according to an additional note of an embodiment.

Assuming equal priority frequencies, the current specification defines that If the serving cell fulfils $Srxlev > S_{nonIntraSearchP}$ and $Squal > S_{nonIntraSearchQ}$, the UE may choose not to perform measurements of E-UTRAN inter-frequencies or inter-RAT frequency cells of equal or lower priority, which is important rule to reduce UE power consumption. On the other hand, for the purpose of load re-distribution of UEs it may be necessary to force some UEs to perform inter-frequency measurement and cell reselection as suggested by CSP or CSPP whenever a higher priority cell is provided in the cell specific priority list, which will result in additional UE power consumption. So, it's preferable that inter-frequency measurement and cell reselection should be performed only once for load re-distribution. For example with CSPP, the given probability, Prs=0.2, is applicable for a one-shot reselection in a given re-distribution event, i.e., if the cell reselections are performed twice or more then Prs will no longer be 0.2, as shown in FIG. 14. FIG. 14 illustrates number of UEs moved to other frequency vs. # of cell reselections.

Proposal: The UE should perform inter-frequency measurement and cell reselection only once in a given load re-distribution event.

To avoid multiple inter-frequency measurements and cell reselections, the re-distribution of UEs should be triggered by such as "reselection indication" provided in SIB or dedicated signalling. The "reselection indication" also includes a counter value, as similar to the existing value tag in SIB, in order that the UE identify whether the inter-frequency measurement and cell reselection are performed by the "reselection indication". The counter value is assumed to be increased when a cell reselection is triggered. The UE would compare the current counter value to the latest counter value which previously triggered a cell reselection, and it determine whether a new cell reselection should be performed or not.

Proposal: The inter-frequency measurement and cell reselection should be triggered by an indication provided in SIB or dedicated signalling, which possibly contains a counter value in order to confirm validity of the indication.

(Cell Reselection Criteria Aspects)

According to the current specification, intra-frequency cells and equal priority inter-frequency cells are ranked by R-criteria, and the best cell in the ranking is selected as the new cell. The rule ensures the best performance in UE throughput when the UE transitions to Connected from RSRP point of view, although it cannot consider RSRQ/SINR and cell load aspects. It cannot fulfil the agreed requirement that Maximize user throughput and network capacity (in terms of system throughput, connection establishment, RA, (inter-frequency) mobility related signalling) for UEs in CONNECTED.

Propsal: The solutions should consider enhancements in the ranking mechanism to maximize user throughput and network capacity.

CSPP does not use this rule since the UE will randomly select a cell among the same priority cells, while CSP reuses the rule. Although this rule is beneficial in the past, it should be enhanced for today's multi-carrier operations, i.e., to avoid the mass reselection. It could be considered there are four options as follows;

Option 1: Ranking Randomization (RR), as is in CSPP.

In contrast to the current ranking mechanism, the cell is reselected randomly from all cells which fulfil S-criteria, i.e., not only the best ranked cell but also the second ranked cell, the third ranked cell and so on. This option can solve the mass reselection problem, although it's possible to reselect worse cell than expected from the radio condition point of view, and it results in increasing handover for throughput optimization when the UE transitions to Connected.

Option 2: Ranking Randomization with Range (RRR)

This option is enhancement over option 1 (RR). As same as option 1, the reselected cell is randomized regardless of its ranking, but it's limited within a range. The range is set with e.g., 3 ranks, and then the cell is reselected from top three cells in the ranking, the best cell, the second best cell or the third cell. The rank may be enhanced with value of X dB, and then the cell is chosen from the cells fulfil its RSRP is over RSRP of the best ranked cell minus X dB. The benefit of this option over option 1 (RR) is to ensure moderate signal strength within the range, which contributes to reduce handover for user throughput optimization when the UE transitions to Connected.

Option 3: Ranking Specific Probability (RSP)

With this option, probabilities for each rank are provided by the serving cell. For example with three ranks, the probabilities are set with 50% for the best rank, 30% with the second rank and 20% for the third rank. The UEs uses random number in the ranking mechanism and 50% of the UEs reselect the best ranked cell. In similar fashion, 30% of the UEs reselect the second best cell and 20% reselect the third ranked cell. The benefits in this option is not only to build on the existing ranking mechanism but also to avoid reselecting the worse ranked cell, e.g., the fourth ranked cell which reduce handover for user throughput optimization when the UE transitions to Connected.

Option 4: Grouping and Group Specific Re-Distribution (GSR)

This option assumes that a dedicated signalling, e.g., RRCConnectionRelease, includes specific group ID. After the grouping, the serving cell may provide in SIB different set of cell reselection parameters and/or a trigger of cell reselection for each group. Considering all UEs transition to Connected during e.g., initial attach, it could be possible to configure all UEs with each group. It's FFS how to handle the group when UEs perform cell reselection.

Option 1 cannot avoid handover for user throughput optimization when the UE transitions to Connected, while the other options can solve it. Option 2 and Option 3 can perform "soft" re-distribution among cells under network control. Option 4 can work as "full network controlled" re-distribution. Considering complexity of the control, option 2 or option 3 is slightly preferable solution.

Proposal: RAN2 should consider either the ranking randomization with a range (RRR) or the ranking specific probability (RSP) for equal priority inter-frequency cell reselection.

[Additional Note 3]

This additional note considers the solutions with per-cell parameter and/or reselection probabilities for the one-shot re-distribution mechanism.

(One-Shot Re-Distribution Mechanism)

The one-shot re-distribution obviously needs a trigger for the initiation of special cell reselection procedure. The following solutions for cell reselection by fraction of UEs are considered after the triggering.

(Cell Reselection by Fraction of UEs)

It's one of big challenges in this WI that Solution should be able to move fraction of the UEs from one cell to another cell. The possible solutions were suggested as follows;

Assuming the cell-specific priority list is provisioned in advance and the priority has to be higher than that of the serving cell;

Option 1-a: Cell-Specific Priority with Random Threshold Offset

If it could be applicable to the one-shot re-distribution, when a trigger happens the UE generates the random value for a cell of higher priority frequency, and the UE reselects the cell if Squal>Thresh'$_{X, High_Q}$ or Srxlev>Thresh'$_{X, HighP}$ is fulfilled, wherein Thresh'$_{X, High_Q}$ or Thresh'$_{X, HighP}$ is applied with the randomized offset (i.e., Thresh'$_{X, High_Q}$=Thresh$_{X, High_Q}$+offset$_{x/cell}$*random).

One drawback with this approach is that the Thresh'$_X$ may not ensure good user throughput with wider/negative range of the randomized offset and that only UEs in cell-edge can move to the other cell with narrower range of the randomized offset.

Option 1-b: Cell-Specific Priority with Probability (CSPP)

If it could be applicable to the one-shot re-distribution, when a trigger happens the UE generates the random value for the cell prioritized and reselect it if the random value exceeds the probability provided.

One drawback may be that the cell reselected can only ensure S-criteria, not for Thresh$_X$ nor R-criteria. It may result in the degradation of user throughput when the UE transitions to RRC Connected.

Option 1-c: Counter-Based Scheme with Number of Cell Reselection

If it could be applicable to the one-shot re-distribution, whereby the UE keeps track of the number of reselections and when a trigger happens, the UE decides whether the cell reselection priority should be applied or ignored based on the counter value.

Independent of the priority handling, i.e., not only for higher priority cells;

Option 2-a: Ranking Randomization within a Specified Range

This option is a kind of extension on Option 1-b (from the randomization point of view) and essentially similar approach with Option 1-a (from the range concept perspective), but Option 2-a focuses on the enhancements in the ranking process. With the specified range, the degradation of user throughput may be limited and is under network control. The details of range are FFS, e.g., the unit may be [dB].

Option 2-b: Ranking-Specific Probability

This option is basically similar approach with Option 2-a, but Option 2-b focuses on the enhancements in the ranking process with probabilities similar to Option 1-b. Since the probability is corresponding to each rank, the UE is allowed to reselect the cell with better rank order and probabilities.

All options could move fraction of the UEs from one cell to another cell. The most significant difference between Options 1-x and Options 2-x is whether a cell specific priority list (CSP) is needed or not. Since Options 1-x would only take the priority handling in the reselection consideration, the reselected cell may not be (sub-)optimal for each UE from the radio quality point of view, i.e., the new cell may only fulfil the S-criterion even if some cells offering better radio quality are available around the UE. In addition, Options 1-x cannot consider equal priority frequencies/cells since these options rely on the configuration with higher priority frequencies/cells.

Options 2-x may be based on the existing ranking process which ensured a cell reselection to a better cell as the result of comparison to cells the UE detects. So, Options 2-x can potentially Maximize user throughput and network capacity (in terms of system throughput, connection establishment, RA, (inter-frequency) mobility related signalling) for UEs in CONNECTED. Therefore, the one-shot re-distribution should adapt the ranking process.

Proposal 1: The ranking process should be enhanced for the one-shot re-distribution.

(Target Cells/Frequencies for Enhanced Ranking Process)

If Proposal 1 is agreeable, the issue is which cell/frequency should be considered in the enhanced ranking process. In the current specification, the evaluation with the R-criteria applies for intra-frequency and equal priority inter-frequency cells. So, to minimize changes in the specification, the target cells/frequencies for the enhanced ranking process should also be considered under equal priority cells/frequencies.

Proposal 2: The target cells/frequencies in the one-shot re-distribution should only be applicable under equal priority.

If Proposal 2 is acceptable, it's necessary to determine how the equal priority target cells/frequencies are provided to the UE for the one-shot distribution. The following alternatives could be considered;

Alt.1: The serving cell provides the cell/frequency list explicitly;

The UE simply consider the cells/frequencies provided in the list in the enhanced ranking process.

Alt.2: The serving cell provides the cell/frequency implicitly;

It could use the extended cell reselection priority. For each cell/frequency configured with the extended cell reselection priority, the UE determines these cells/frequencies for enhanced ranking process. It's FFS whether the UE should also take the legacy cell reselection priority into account or not, while some examples are suggested on Table 1.

From the perspective of signalling overhead, Alt.2 is better than Alt.1. However, Alt.2 will need at least one more rule to determine the target cells/frequencies, e.g., whether the prioritized cells/frequencies in the legacy cell reselection priority should still be prioritized. Although pros and cons can be seen in both alternatives, Alt.2 is slightly preferred solution.

Proposal 3: RAN2 should decide if the cells/frequencies configured with the extended cell reselection priority should be considered as equal priority in the one-shot re-distribution.

TABLE 1

Examples of implicit target cells/frequencies provisioning with Alt. 2

| | Legacy priority i.e., cellReselectionPriority [10] | Extended priority e.g., CellReselSubPriority-r12 [11] | Alt. 2-1 | Alt. 2-2 | Alt. 2-3 | Alt. 2-4 |
|---|---|---|---|---|---|---|
| F1 | 7 | 3 | Target | Target | Target | Target |
| F2 | 7 | 3 | Target | Target | Target | Target |
| F3 | 7 | 1 | Target | | Target | |
| F4 | 7 | (not provided) | | | | |

TABLE 1-continued

Examples of implicit target cells/frequencies provisioning with Alt. 2

| | Legacy priority i.e., cellReselectionPriority [10] | Extended priority e.g., CellReselSubPriority-r12 [11] | Alt. 2-1 | Alt. 2-2 | Alt. 2-3 | Alt. 2-4 |
|---|---|---|---|---|---|---|
| F5 | 3 | 3 | | | Target | Target |
| F6 | 3 | 1 | | | Target | |
| F7 | 3 | (not provided) | | | | |

Note:
The serving cell may be legacy priority 5, and the target cells/frequencies are configured;
Alt. 2-1: With a (e.g., higher) legacy priority and any extended priority.
Alt. 2-2: With a (e.g., higher) legacy priority and a (e.g., higher) extended priority.
Alt. 2-3: With any extended priority, regardless of the legacy priority.
Alt. 2-4: With a (e.g., higher) extended priority, regardless of the legacy priority.

(Additional Considerations)
Further Considerations for Randomization

It was pointed out that the probability-based scheme has some concern on the testability and/or controllability of the reselection by the network. Thus, the counter-based scheme was suggested as an alternative to the probabilistic-based scheme. However, if the probability-based scheme is really problematic, it could also be considered whether the randomization may be based on the UE_ID (or the IMSI) similar to the existing paging frame/occasion determination. For example of IMSI, the UE could perform the (special) cell reselection procedure if (IMSI mod Np)=Nr is fulfilled, wherein Np and Nr configured based on the expected probability and fairness among UEs. If Np and Nr are configured with 10 and 0 respectively, the probability fulfilling the formula is 10%. If the IMSIs are assumed adequately randomized among UEs within a cell, the network may control the probability, while the UE testability would be much simpler.

Proposal 4: If the probability-based scheme is not preferred, the IMSI-based randomization should be one of potential methods instead.

Possibility of RSRQ/SINR-Based Ranking Process

The current R-criteria only consider RSRP, thus any radio quality are not taken into account. If only received power is evaluated, it could ensure the optimal throughput in homogeneous network with macro cells. However, today it cannot be true with HetNet deployments, e.g., the small cell located near a macro cell may offer better RSRP but worse RSRQ than a cell on the frequency layer with small cell only. To maximize the user throughput and network capacity when the UE transitions to Connected, it's worth revisiting the R-criteria with RSRQ or SINR. If IDLE UEs uses a more accurate indication of signal quality than what is used today, it would potentially meet the requirement to Maximize user throughput and network capacity (in terms of system throughput, connection establishment, RA, (inter-frequency) mobility related signalling) for UEs in CONNECTED.

Proposal 5: RAN2 should consider whether the R-criteria should be revisited using a different signal quality criteria considering HetNet deployments.

[Additional Note 4]
(Introduction)

In this additional note, the two mechanisms are identified for the multi-carrier load distribution, i.e., the continuous distribution and the one-shot re-distribution, and the solutions with per-cell parameter and/or reselection probabilities are considered.

(Pre-Conditions and Post-Conditions)

Before considering the solutions, it's worth revisiting why the idle UEs may be distributed non-uniformly among multiple carriers today. FIG. 1 illustrates three possible pre-conditions, i.e., (a) to (c), and a post-condition, i.e., (d), assuming four frequency layers for the purpose of coverage and capacity. F1 is the lowest frequency (e.g., 800 MHz, thus it has larger coverage) and F4 is the highest frequency (e.g., 3.5 GHz, thus it has smaller coverage), wherein it's noted in FIG. 1 that the condition (b) has reverse order compared to the other conditions. In the condition (a) and (b) each frequency layer has different cellReselectionPriority, while the condition (c) intends equal priority among all frequencies.

The condition (a) may be considered as a typical priority configuration, whereby the small cell layers on higher frequencies are prioritized for reselection to achieve capacity enhancements. The UEs are camped on F4 or F2 as long as the S-criteria of the cell is fulfilled, since the current specification forces the UE to perform inter-frequency measurements and cell reselection to a cell configured with higher priority frequency than the frequency of the serving cell, regardless of Squal/Srxlev of the serving cell.

The condition (b) may be considered for the coverage-prioritized configuration e.g., in Dual Connectivity capable network. This results in a worse condition than condition (a), since all UEs are camped on F1.

It should be noted that the cellReselectionPriority may cause load imbalance of idle UEs beyond just two frequency layers, i.e., imbalance between F1 and F2, or between F3 and F4 in FIGS. 15a to 15d. Although the current mechanism allows configuring different $Thresh_{X,\ HighQ}$/$Thresh_{X,\ HighP}$ for each frequency priority, it cannot solve the distribution issue since a change of these parameters cause mass reselection and agreement 2 "Solution should be able to move fraction of the UEs from one cell to another cell" above cannot be met. Even if the cell specific priority is provided in Rel-13, the prioritized cell may experience higher load due to the mass reselection (also known as "surge of UEs" or "closely located UEs problem") assuming the cells offers the same capacity (e.g., the same bandwidth), although the solution may work well in a specific scenario, e.g., reselection to small cells on co-channel HetNet layer.

The cell reselection prioritization itself may cause load imbalance among multiple frequencies, regardless of whether it's on a frequency layer or a cell layer.

Condition (c) configures all frequency layers with the same priority, i.e., equal priority inter-frequency case. With equal priority inter-frequency, the cell ranking is performed by R-criteria and the UE should select a cell with the best RSRP, taking into account of the Qoffset to compensate for different pathloss due to different frequencies. As in the case for conditions (a) and (b), the current mechanism also cannot meet the agreement that Solution should be able to move fraction of the UEs from one cell to another cell. However, the current cell ranking mechanism is useful in solving the issue "Maximize user throughput and network capacity (in terms of system throughput, connection establishment, RA, (inter-frequency) mobility related signalling) for UEs in CONNECTED", since the UE can reselect the cell that offers the best radio condition, although it only relies on RSRP.

The equal frequency priority with cell ranking has a potential to maximize user throughput and network capacity.

The condition (d) is an example of a desirable post-condition, wherein the UEs are camped on each frequency/cell uniformly and all cells are not heavy-loaded. The post-condition in (d) is consistent with the agreement above that a Solution should be able to move fraction of the UEs from one cell to another cell which may be using e.g. per-cell parameter and/or reselection probabilities.

The most significant benefit of the enhanced continuous distribution mechanism such as CSP is to allow the cells to remain lightly-loaded, i.e., the network's UE distribution may be maintained and used to prevent the pre-conditions (a)~(c) in FIGS. 15a to 15d from occurring. On the other hand, one of the main drawbacks with the enhanced continuous distribution is the impact to the power consumption of IDLE UEs even though the network does not suffer from any over-load conditions. If further solutions such as the cell-specific priority with probability and/or with random threshold offset are introduced, the UE power consumption may be substantially increased. Additionally, operators may face challenges to modify their existing network reselection mechanism even if the operator does not suffer from the necessity redistribute idle UEs.

The enhanced continuous distribution mechanism is expected to have more impacts on the UE power consumption and the configurations of the existing network deployments.

In light of Observation 3 if an enhanced continuous distribution is introduced to fulfil the agreement that 4) It should be possible to control the load distribution among individual cells rather than only on a carrier level (for example the scenario that the macro cell in a co-channel Het-Net deployment and/or certain small cells on another carrier may be overloaded), it should not require drastic changes to network deployment, but simply aim to provide more flexibilities based on the existing mechanism.

Proposal 1: The existing reselection mechanism or the small enhancement may work well, other than some heavily loaded network deployment scenarios.

Even if the enhanced continuous distribution could statistically maintain the network under light load, the traffic demands, which is correlated with the density of IDLE UEs in an area, could vary significantly e.g., at sports events, during commuting hours, within a shopping mall in weekends or under emergency conditions. In such a heavy-loaded condition, there should be a means for the network to return to a more balanced loaded condition as soon as possible, by means of a one-shot re-distribution mechanism. Once the one-shot re-distribution mechanism allows the network to return to a normal load condition, the enhanced continuous distribution may be activated again to maintain the network under the balanced load condition.

The one-shot re-distribution mechanism may be useful under heavily loaded network due to sudden surge in traffic demand.

Since the one-shot re-distribution mechanisms is mainly used for cases of heavily loaded network due to sudden surge in traffic demand, it may be applied independently of the existing mechanisms and thus it will not conflict with the current network strategies. Furthermore, the impacts on UE power consumption would be reduced since the power-consumed event is performed only once. The network may initiate the one-shot re-distribution when it experiences higher load in multiple cells/frequencies, i.e., the preconditions (a)~(c) in FIGS. 15a to 15d. In addition, the word "re-distribute" within agreement 1) above is consistent with the need for a one-shot re-distribution mechanism, since the continuous distribution or enhanced continuous distribution should not be depicted by as a means to "re-distribute" the UEs.

Proposal 2: RAN2 should consider the one-shot re-distribution mechanism as an independent mechanism from the continuous distribution or enhanced continuous distribution mechanism.

(Enhanced Continuous Distribution Mechanism)

For the extreme case when the network is lightly loaded and there is only one UE camped on the macro cell, there is no reason for the UE to stay on the macro cell layer when a small cell fulfils a threshold for the UE. In this case, either the prioritization mechanisms, or the existing frequency priority or the additional cell-specific priority (CSP), still works well. With the CSP which was already a baseline, the network is offered more flexibility in its configuration with minimum impacts on the existing rules for the priority handling. This is similar approach with the agreements for IncMon to Extend the number of cell reselection priorities to reduce number of reselections between equal priority carriers, from the configuration flexibility point of view. Therefore, the enhanced continuous distribution based on the existing cell reselection mechanism should only have an additional means to configure priorities on a cell basis with CSP, although it should be noted that it potentially has a drawback which may lead to load imbalance when the number of UEs increases, as suggested in Observation 1, in which case another solution may be needed, i.e., the one-shot re-distribution mechanism.

Proposal 3: RAN2 should conclude for lightly/medium loaded network that no additional mechanism is necessary in the existing cell reselection mechanism, except for optional provisioning of the cell-specific priority and the already agreed extended reselection priorities.

(Benefit of One-Shot Re-Distribution Mechanism)

Trigger for Re-Distribution

The trigger for re-distribution, i.e., when the UE initiates/continues the (special) cell reselection procedure, may be based on one of the following options:

Option 1: When the network broadcasts parameters for the re-distribution;

Option 1-a: When the network provides the list of cell-specific priorities;

It's assumed as the trigger for the cell-specific priority with randomization as well as CSP itself. The UE should continue the cell reselection procedure, including inter-frequency measurements, as long as the cell-specific priority provided is higher than the priority of serving cell, as it is today.

Option 1-b: When the network provides the list of cell-specific probabilities;

This option assumes the trigger for reselection is based on the cell-specific priority with probability (CSPP). The UE should generate a random value and perform the cell reselection procedure when the random value is over the cell-specific priority provided.

Option 1-c: When the network provides the maximum value of reselections;

This option assumes the counter-based scheme. The UE should count the number of cell reselection performed and ignore the higher-prioritized cell when the count is over the maximum value broadcasted by the serving cell.

Option 1-d: When the network updates the parameters;

It's assumed the trigger is implied by the updated parameters in SIB or the paging. The UE should apply the updated parameters and perform the cell reselection procedure.

Option 2: When the network provides an explicit request;

This option assume a pure trigger for re-distribution. The UE applies the (special) parameters and perform the cell reselection procedure only once upon reception of the request. The request may require 1-bit signalling in either a SIB or in the paging message as an application. The UE may only monitor the request since the parameter for the (special) cell reselection can be broadcasted in advance.

Option 3: When the serving cell configures dedicated parameters over RRC Connection Release;

It's for the specific case the UE transitions from RRC Connected to Idle and the RRC Connection Release may have the additional cell-specific offsets, the extra grouping, and/or the existing dedicated priority.

Options 1-x are based on typical mechanisms for reselection control, but these have some drawbacks. With Options 1-x, the UE is forced to apply additional continuous inter-frequency measurements during the parameters are provided, e.g., if the cell prioritized by Option 1-a is not on the frequencies prioritized by the existing cellReselectionPriority. It results in additional UE power consumption and it should be avoided. Also, it's not crystal clear at which points in time the UE should re-calculate the probability.

Additionally, Options 1-x may require the UE to monitor continuously to check whether the parameters are updated, or whether the network decided to initiate a (special) cell reselection procedure. Option 2 is a simple solution for the one-shot re-distribution mechanism, although it does require 1-bit signalling to inform UE of the activation of this procedure. Option 3 may also be an nice way if the solution only relies on the dedicated signalling, but it cannot fulfil the requirement to Maximize user throughput and network capacity (in terms of system throughput, connection establishment, RA, (inter-frequency) mobility related signalling) for UEs in CONNECTED. Therefore, Option 2 is the preferred solution for the trigger for re-distribution.

Proposal 4: The one-shot re-distribution should be triggered by an explicit request indication broadcasted by the serving cell.

Proposal 5: If Proposal 4 is agreeable, RAN2 should discuss whether the indication is provided in SIB or the paging.

The invention claimed is:

1. A user equipment for a mobile communication system, comprising:
   a receiver configured to receive a first parameter broadcasted from a current serving cell and a second parameter broadcasted from the current serving cell; and
   a controller configured to reselect a target cell to be used as a serving cell from among a plurality of cells operated at different frequencies, wherein
   the first parameter is a parameter that defines a probability for performing reselection of the target cell,
   the second parameter is a timer value to be set in a timer started at a timing at which a quality measurement for neighbor cells ends, and
   the controller is configured to
      after receiving the first parameter and the second parameter, periodically measure qualities of neighbor cells when the timer expires,
      compare a value calculated by modulo operation using IMSI (International Mobile Subscriber Identity) of the user equipment with a value corresponding to the first parameter, and
      reselect the target cell from among cells having a quality satisfying predetermined quality criteria, based on results of the quality measurement and the comparison.

2. A method performed at a user equipment for a mobile communication system, comprising:
   receiving a first parameter broadcasted from a current serving cell and a second parameter broadcasted from the current serving cell; and
   reselecting a target cell to be used as a serving cell from among a plurality of cells operated at different frequencies, wherein
   the first parameter is a parameter that defines a probability for performing reselection of the target cell,
   the second parameter is a timer value to be set in a timer started at a timing at which a quality measurement for neighbor cells ends, and
   the reselecting comprises:
   after receiving the first parameter and the second parameter, periodically measuring qualities of neighbor cells when the timer expires;
   comparing a value calculated by modulo operation using IMSI (International Mobile Subscriber Identity) of the user equipment with a value corresponding to the first parameter; and
   reselecting the target cell from among cells having a quality satisfying predetermined quality criteria, based on results of the quality measurement and the comparison.

3. A chip for a user equipment for a mobile communication system, comprising:
   at least one processor and at least one memory, the at least one processor configured to perform processes of:
   receiving a first parameter broadcasted from a current serving cell and a second parameter broadcasted from the current serving cell; and
   reselecting a target cell to be used as a serving cell from among a plurality of cells operated at different frequencies, wherein
   the first parameter is a parameter that defines a probability for performing reselection of the target cell,
   the second parameter is a timer value to be set in a timer started at a timing at which a quality measurement for neighbor cells ends, and
   the reselecting comprises:
   after receiving the first parameter and the second parameter, periodically measuring qualities of neighbor cells when the timer expires;
   comparing a value calculated by modulo operation using IMSI (International Mobile Subscriber Identity) of the user equipment with a value corresponding to the first parameter; and
   reselecting the target cell from among cells having a quality satisfying predetermined quality criteria, based on results of the quality measurement and the comparison.

* * * * *